United States Patent
Ito et al.

(10) Patent No.: US 7,382,896 B2
(45) Date of Patent: Jun. 3, 2008

(54) OBJECT DETECTION METHOD AND APPARATUS WHICH PERFORM OBJECT DETECTION USING SET PARAMETERS

(75) Inventors: Wataru Ito, Kodaira (JP); Hirotada Ueda, Kokubunji (JP); Shinya Ogura, Kodaira (JP); Toshiaki Hirama, Kawagoe (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 831 days.

(21) Appl. No.: 10/639,740

(22) Filed: Aug. 13, 2003

(65) Prior Publication Data
US 2004/0032494 A1 Feb. 19, 2004

(30) Foreign Application Priority Data
Aug. 13, 2002 (JP) .............................. 2002-235685

(51) Int. Cl.
*G06K 9/00* (2006.01)
*H04N 7/18* (2006.01)

(52) U.S. Cl. ...................................... 382/103; 348/152
(58) Field of Classification Search ................ 382/103; 348/143, 152
See application file for complete search history.

(56) References Cited
U.S. PATENT DOCUMENTS 6,061,055 A * 5/2000 Marks ......................... 382/276

2003/0174253 A1* 9/2003 Ito et al. ..................... 348/699

FOREIGN PATENT DOCUMENTS

| JP | A-7-79429 | * 3/1995 |
| JP | 08265742 | 10/1996 |
| JP | 2000 050241 | 2/2000 |
| JP | 2000 184359 | 6/2000 |
| JP | 2002 156333 | 5/2002 |
| JP | 2003 61080 | 2/2003 |

* cited by examiner

*Primary Examiner*—Colin LaRose
(74) *Attorney, Agent, or Firm*—Mattingly, Stanger, Malur & Brundidge, P.C.

(57) ABSTRACT

Object detection method and apparatus, including an image-pickup unit picking up the image of a target region, a first recording device accumulating, as a reference image, an image signal from the image-pickup unit, a second recording device storing a table which defines surveillance information on the image signal, an object detection processing unit detecting a target object from the image signal and the reference image, a memory table storing a processing result from the processing unit, and a display unit. The image signal from the image-pickup unit is saved based on the table of the second recording device, and the processing result in the memory table is displayed on the display unit. The surveillance information in the table of the second recording device is modified based on the display of the processing result obtained by the object detection processing unit.

4 Claims, 20 Drawing Sheets

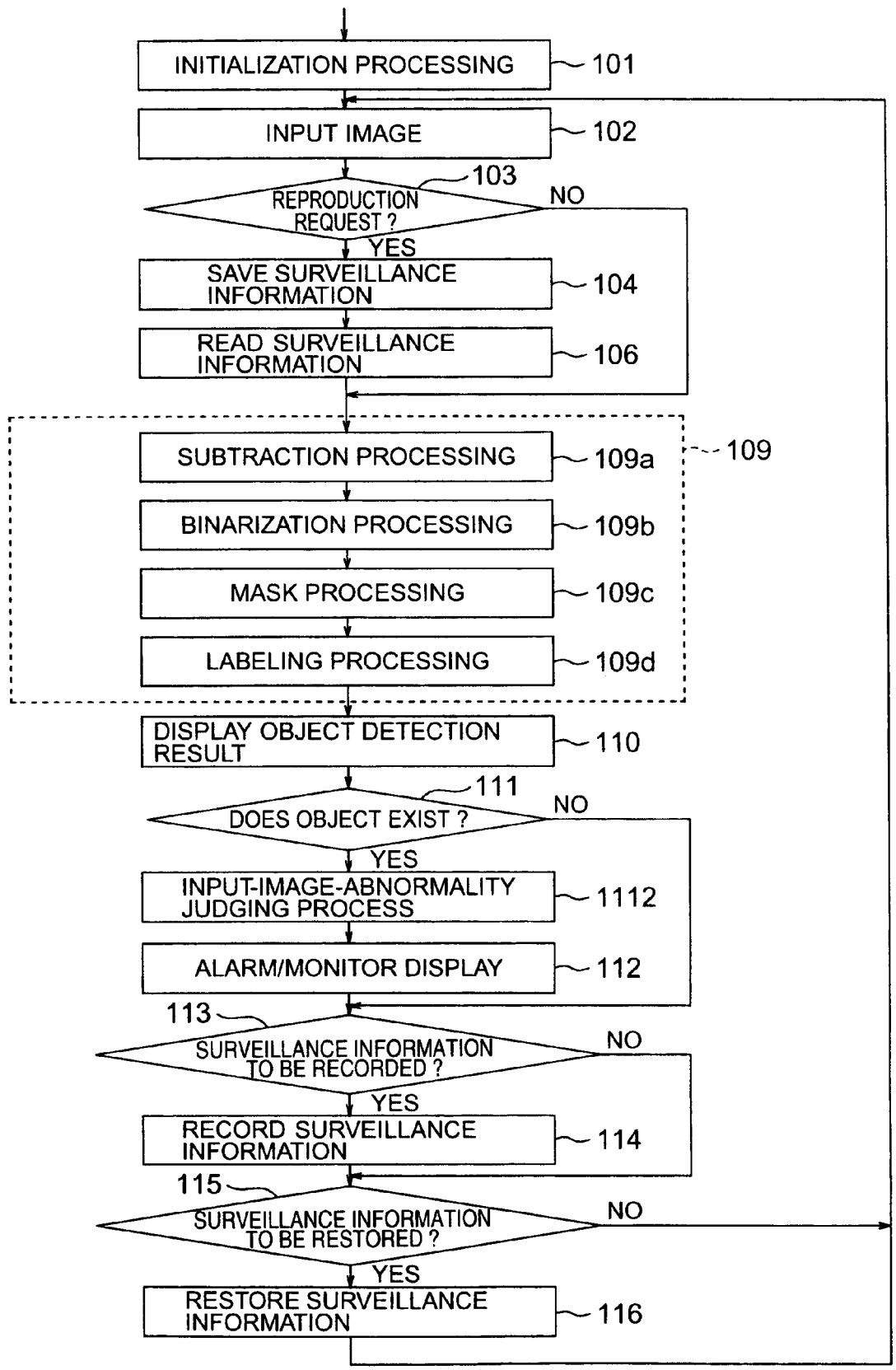

TO FIG. 2B

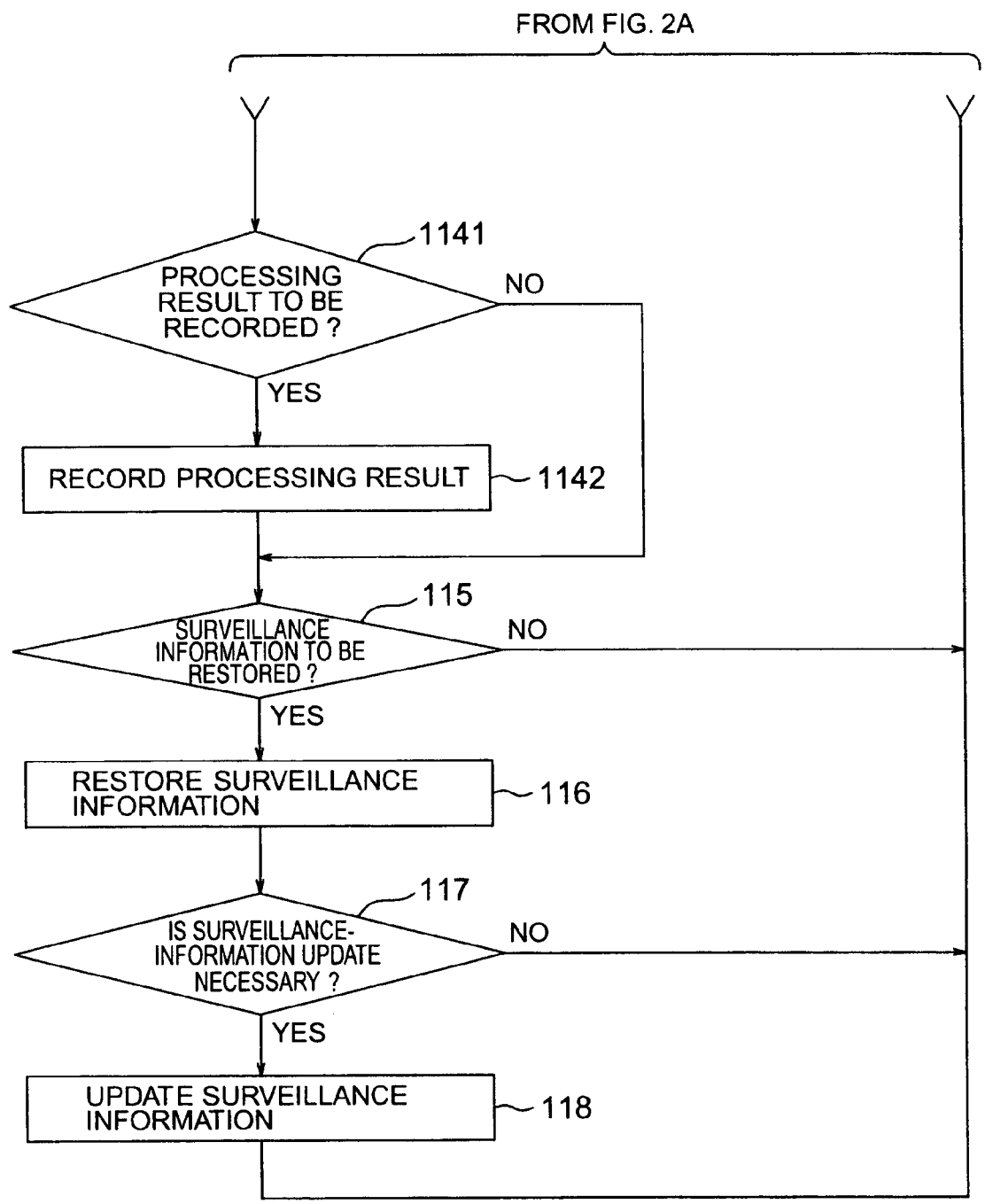

FIG. 6B
SAVING POINT-IN-TIME: 2003. 05. 23. 13. 00. 06, FRAME NO.: 100
SAVING CONDITION: PERIODICAL SAVING
INPUT IMAGE: 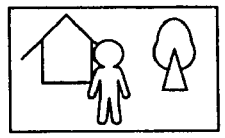
REFERENCE BACKGROUND IMAGE: 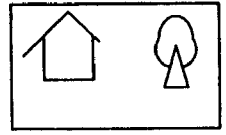
MASKING IMAGE: 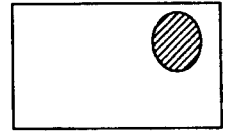
THRESHOLD VALUE: 20
OBJECT DETECTION CONDITIONS: 50, 5000, 5 × 10 — 50 × 100
OTHERS:

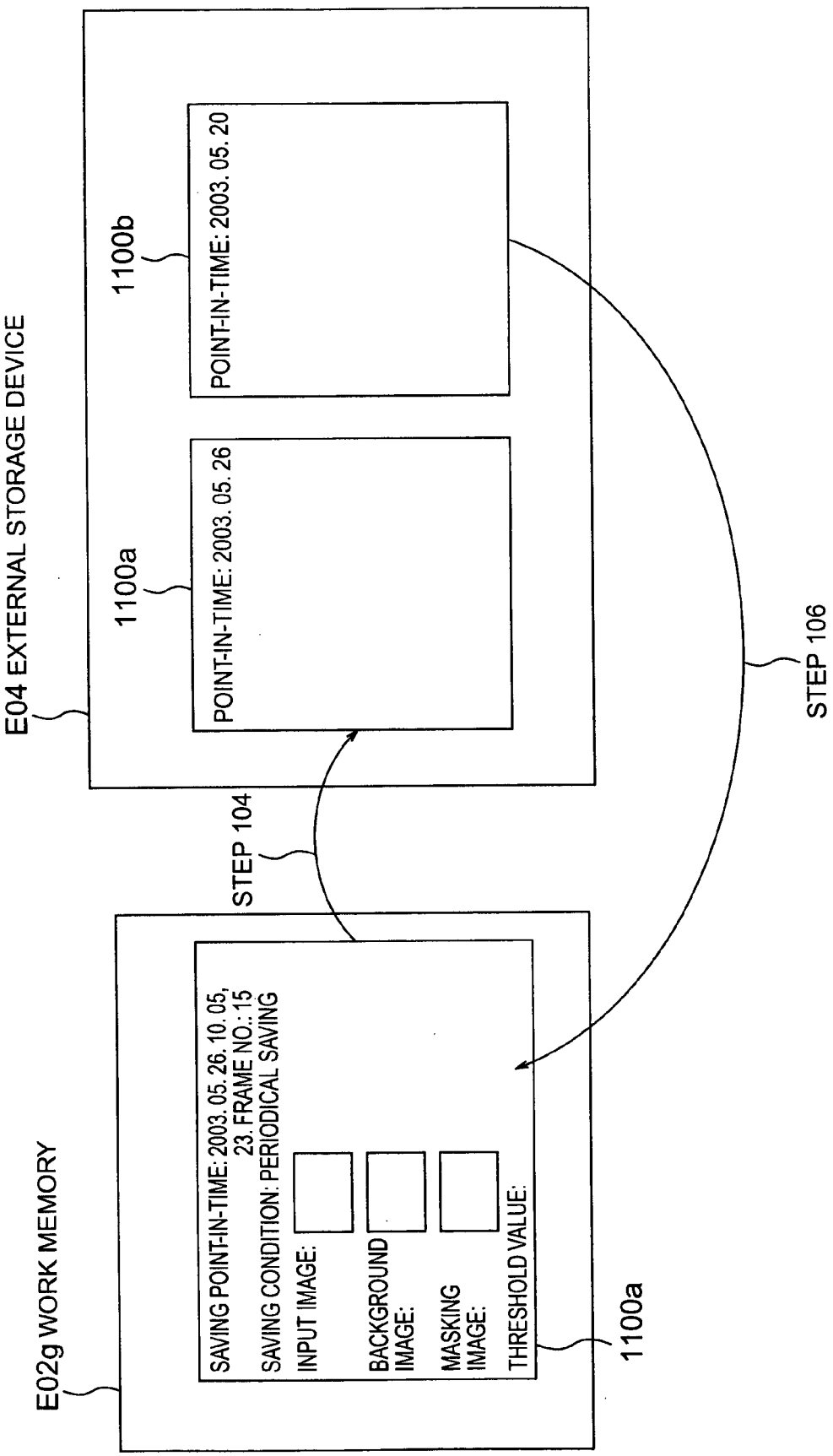

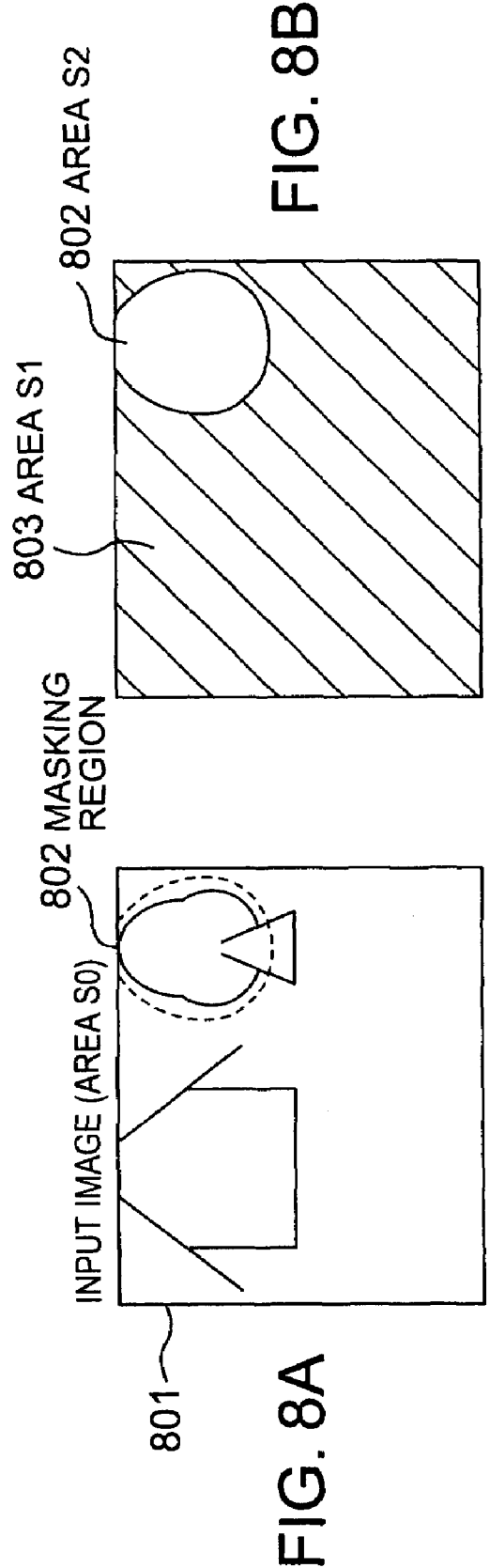
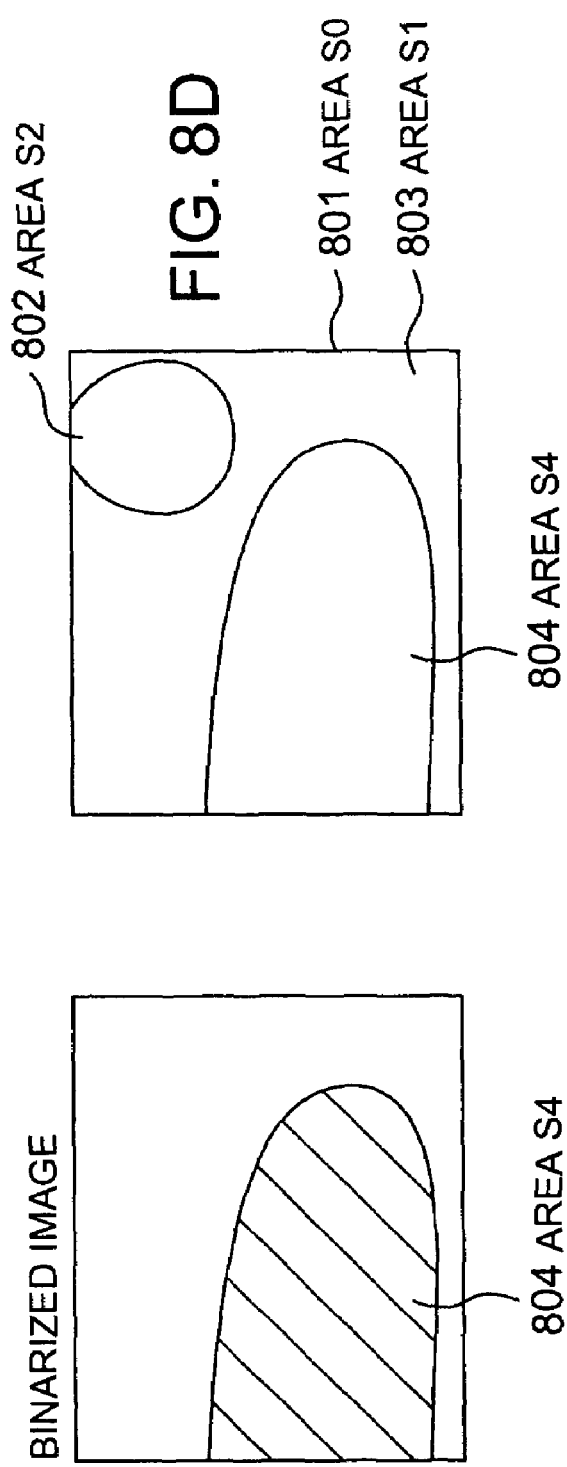

FIG. 9

| FRAME NO. | INTRUSION DETECTION |
|---|---|
| 5 | YES |
| 10 | YES |
| 15 | YES |
| 20 | YES |
| 25 | NO |
| 30 | NO |
| 35 | YES |
| 40 | YES |

| SURVEILLANCE APPARATUS (ID NO.) | MAINTENANCE TIME-AND-DATE | CONTENTS OF MAINTENANCE | SERVICE POINT |
|---|---|---|---|
| E00a | 2003.7.26  14:31 | ADJUSTING THRESHOLD VALUE | 1 |
| E00a | 2003.7.26  14:51 | UPDATING REFERENCE BACKGROUND IMAGE | 2 |
| E00b | 2003.8.03  18:20 | MODIFYING OBJECT DETECTION CONDITIONS | 2 |
| E00b | 2003.8.07  12:29 | MODIFYING MASKING IMAGE | 3 |
| E00c | 2003.8.17  12:29 | ADJUSTING THRESHOLD VALUE | 1 |
| ... | ... | ... | ... |

OBJECT DETECTION METHOD AND APPARATUS WHICH PERFORM OBJECT DETECTION USING SET PARAMETERS

CROSS-REFERENCE TO RELATED APPLICATION

This invention relates to U.S. patent application Ser. No. 10/387,433 filed on Mar. 14, 2003 in the names of Wataru Ito, Shinya Ogura and Hirotada Ueda, and assigned to the same assignee of the present application, and entitled "object detection method using an image-pickup device with easy detection masking region setting and object detection apparatus using the method". The disclosure of U.S. patent Ser. No. 10/387,433 is hereby incorporated by reference.

BACKGROUND OF THE INVENTION

The present invention relates to an object detection system using an image-pickup device. More particularly, it relates to an intruding-object surveillance method and an intruding-object surveillance apparatus that, by processing the image signals, allow an object to be automatically detected which has intruded within a detection target region.

Conventionally, the remote-monitor-scheme surveillance systems using the image-pickup device such as a TV camera (television camera) have been widely used. Moreover, many of these systems are the systems based on the so-called manned surveillance scheme by which surveillance personnel perform the surveillance while watching the images displayed on a monitor.

In these manned-surveillance-scheme surveillance systems, however, the surveillance personnel are required to watch all the time the images displayed on the monitor. This is needed to identify an intruding object in real time, such as a human or an automobile that is coming into a surveillance target region. Accordingly, so much burden is imposed on the surveillance personnel. In addition thereto, it is impossible to avoid an occurrence of oversight, since there exists a limit to the human's concentration. Consequently, there exists problem in reliability.

In view of this situation, in recent years, it has been getting more and more strongly requested to implement the so-called automatic-detection-scheme surveillance system instead of the manned surveillance scheme as described above. In this automatic-detection-scheme surveillance system, an intruding object is automatically detected by the signal processing of the images picked up by a TV camera, thereby allowing the execution of a predetermined notice-giving or alarm-issuing procedure step.

By the way, the implementation of the automatic-detection-scheme surveillance system like this necessitates a function of using a certain surveillance scheme so as to detect, from the image signals, a surveillance target object that should be assumed to be an intruding object. As one example of the surveillance scheme at this time, there exists a method referred to as "subtraction method". This subtraction method, which is disclosed in, e.g., JP-A-7-79429 and the like, has been widely used conventionally.

Here, this subtraction method is the following one: Of images picked up by a TV camera, an image where there exists none of an intruding object to be detected is selected and stored in advance as a reference background image. Next, a comparison is made between an input image (i.e., image outputted from the TV camera) and this reference background image, thereby determining a subtraction or difference between the luminance values on each pixel basis. Moreover, the subtraction values are subjected to a difference-judging processing under a predetermined threshold value, thereby generating a binarized image. Finally, if, within the binarized image, there appears a region that has exceeded a predetermined size, the region is assumed to be an intruding object, then being detected.

In the case of the subtraction method, enhancing the detection accuracy of an intruding object requires the existence of several conditions to be considered as parameters. As the representative parameters among them, there exist the above-described threshold value and a masking region that will be described later.

At first, explanation will be given below concerning the threshold value. FIG. 4A illustrates an example of the case where the threshold value set in advance is a proper one. In this case, as a result of performing the threshold-value processing to a subtraction between an input image 401 and the reference background image, because of the proper threshold value, a person existing within the input image 401 has been able to be correctly detected as an intruding object 401a.

Meanwhile, FIG. 4B illustrates an example of the case where the set threshold value is smaller than the proper one. In this case, because of the small threshold value, the following detection result has been obtained: Although no subtraction should occur in grass/tree portions between an input image 402 and the reference background image, the grass/tree portions have been also detected as intruding objects. As a result, three types of intruding objects, i.e., 402a, 402b, and 402c, have been assumed to exist within the input image 402.

Conversely, FIG. 4C illustrates an example of the case where the set threshold value is larger than the proper one. In this case, because of the large threshold value, the following detection result has been obtained: In the region where there exists the object to be detected, it is impossible to detect a portion in which a subtraction between an input image 403 and the reference background image is small. As a result, the one person, who, originally, should be detected as the intruding object 401a as is illustrated in FIG. 4A, has been detected as split plural objects, i.e., 403a and 403b, The explanation given so far makes it possible to easily understand the following facts: In the subtraction method, the setting of the threshold value is one of the significant factors for determining the detection performance and detection accuracy of an object. Simultaneously, the correct setting of this threshold value requires a high-level proficiency.

Next, explanation will be given below regarding the masking region. Here, at first, FIG. 5A illustrates an example of an input image 501 in the case where, similarly to the case in FIG. 4A, an intruding object 501a has been able to be normally detected. On the other hand, FIG. 5B illustrates an example of the following case: Objects that, originally, are supposed to have already become the background within an input image 502, e.g., grasses and trees existing within the input image 502, have moved for some reason or other (namely, e.g., have been swayed by the wind).

Moreover, in this case in FIG. 5B, in the grass/tree portions as well, there occur differences between the input image 502 and the reference back-ground image despite the fact that no intruding object exists except an object (i.e., person) 502a. As a result, three types of objects, i.e., 502a, 502b, and 502c, will be assumed to exist within the input image 502.

In view of this situation, in the case like this, the following mask processing becomes necessary: As illustrated in FIG.

5C, at first, a masking region 503b is set within an input image 503 with respect to a region where there exist objects that will be moved by the wind, e.g., grasses and trees. Next, the inside of this masking region is processed as an insensitive region (i.e., region in which no judgment is made concerning the existence of an object). For example, U.S. patent application Ser. No. 10/387,433 relates to a mask processing.

Incidentally, this mask processing, which is applicable not only to the subtraction method but also to various object detection methods, is effective in enhancing the object detection performance.

In the case of this mask processing, however, no sufficient performance can be acquired unless the setting of the masking region has been properly implemented. In the case of, e.g., the input image 503 in FIG. 5C, the masking region must be set as follows: Excluding a region where an intruding object 503a should appear, only the objects such as the grasses and trees are correctly masked which, by being moved by the wind or the like, are in a danger of being falsely detected as the intruding objects.

Accordingly, it becomes possible to easily understand the following facts: In the subtraction method, the setting of the masking region is also one of the significant factors for determining the detection performance and detection accuracy of an object. Simultaneously, the correct setting of this masking region also requires a high-level proficiency.

Incidentally, so far, explanation has been given employing the subtraction method as the example. However, not only in the subtraction method but also in the other object detection methods, maintaining the object detection performance necessitates the parameters such as the threshold value and the masking region, and also necessitates the correct setting of these parameters.

In view of the above-described situation, in the automatic-detection-scheme surveillance system according to the prior art, when starting the operation of the surveillance system, it is quite natural that the operator set the parameters to be proper parameters. What is more, during the system operation as well, the operator repeatedly makes an adjustment appropriately, as required, thereby allowing the performance of the surveillance system to be all the time maintained as is specified in the specification thereof under the setting of the proper parameters.

The execution of this repeated adjustment, however, requires that the operator be obliged to always be present at the site of the surveillance system. If this is difficult, maintaining the performance of the surveillance system also becomes difficult. Consequently, there exist problems in the detection accuracy and detection reliability of an intruding object.

Namely, unless the operator had happened to be present just at the very site when there actually occurred a false or erroneous detection of an object, it is difficult to make the judgment as to whether or not the setting of the parameters is proper.

Accordingly, in order to allow the performance of the surveillance system to be properly maintained all the time under the setting of the proper parameters, it is required for the operator to wait for a false detection to occur and then to correct the parameters.

Conventionally, this requirement has forced the operator to standby all the time (i.e., always present) at the installment site of the surveillance system and to wait for the detection of an intruding object by the surveillance system. Here, however, it is completely unpredictable at what point-in-time this detection will occur. Consequently, as described above, maintaining the performance of the surveillance system becomes difficult. As a result, it turns out that there occur the problems in the detection accuracy and detection reliability of the intruding object.

SUMMARY OF THE INVENTION

It is an object of the present invention to provide an object detection method and an object detection apparatus that allow an object detection to be easily executed.

It is another object of the present invention to provide an object detection method and an object detection apparatus that make it possible to easily modify the detection conditions for an object detection.

It is still another object of the present invention to provide a surveillance system and its maintenance method that allow the parameters of the surveillance information to be adjusted at a remote site.

An object detection apparatus according to one aspect of the present invention includes an image-pickup unit for picking up the image of a target region, a first recording device for accumulating, as a reference image, an image signal obtained from the image-pickup unit, a second recording device for storing a table for defining surveillance information on the image signal, an object detection processing unit for detecting an object from the image signal obtained from the image-pickup unit and the reference image obtained from the first recording device, the object becoming a target, a memory table for storing a processing result obtained by the object detection processing unit, and a display unit.

According to the present invention, the image signal from the image-pickup unit is saved based on the table, and the processing result is displayed on the display unit, the table defining the surveillance information and being stored into the second recording device, the processing result being obtained by the object detection processing unit and being saved into the memory table.

Preferably, the surveillance information in the table stored into the second recording device is modified based on the display of the processing result, the processing result being obtained by the object detection processing unit and being displayed on the display unit.

A surveillance-system maintenance method according to another aspect of the present invention in the surveillance system including plural surveillance apparatuses and an operating device connected to the plural surveillance apparatuses via transmission paths, each of the plural surveillance apparatuses including an image-pickup unit for picking up the image of a target region, a first recording device for accumulating, as a reference image, an image signal obtained from the image-pickup unit, a second recording device for storing a table for defining surveillance information on the image signal, an object detection processing unit for detecting an object from the image signal obtained from the image-pickup unit and the reference image obtained from the first recording device, the object becoming a target, a first memory table for storing a processing result obtained by the object detection processing unit, and a display unit.

The surveillance-system maintenance method including steps of selecting any one of the plural surveillance apparatuses by using the operating device, displaying the contents on a display unit of the operating device, the contents being stored in the first memory table of the selected surveillance apparatus, and modifying, based on the displayed contents, the surveillance information recorded in the second recording device.

Other objects, features and advantages of the invention will become apparent from the following description of the embodiments of the invention taken in conjunction with the accompanying drawings.

BRIEF DESCRIPTION OF THE DRAWINGS

FIG. 1 is a flowchart for explaining the processing flow according to a first embodiment of the present invention;

FIG. 2A and FIG. 2B are a flowchart for explaining the processing flow according to a second embodiment of the present invention;

FIG. 6A and FIG. 6B are a diagram for illustrating parameters of surveillance information in the one embodiment of the present invention and a diagram for illustrating records of the surveillance information therein, respectively;

FIG. 7 is a diagram for explaining the situation of an information transfer in the one embodiment of the present invention;

FIGS. 8A to 8D are diagrams for explaining one example of the judgment method for an input image abnormality;

FIG. 9 is a diagram for explaining one example of the recording format of the information on the surveillance result in the one embodiment of the present invention;

FIG. 16 is a diagram for explaining one example of the recording format of adjusted contents of the surveillance-information parameters in the one embodiment of the present invention.

DESCRIPTION OF THE EMBODIMENTS

Figure 2A:
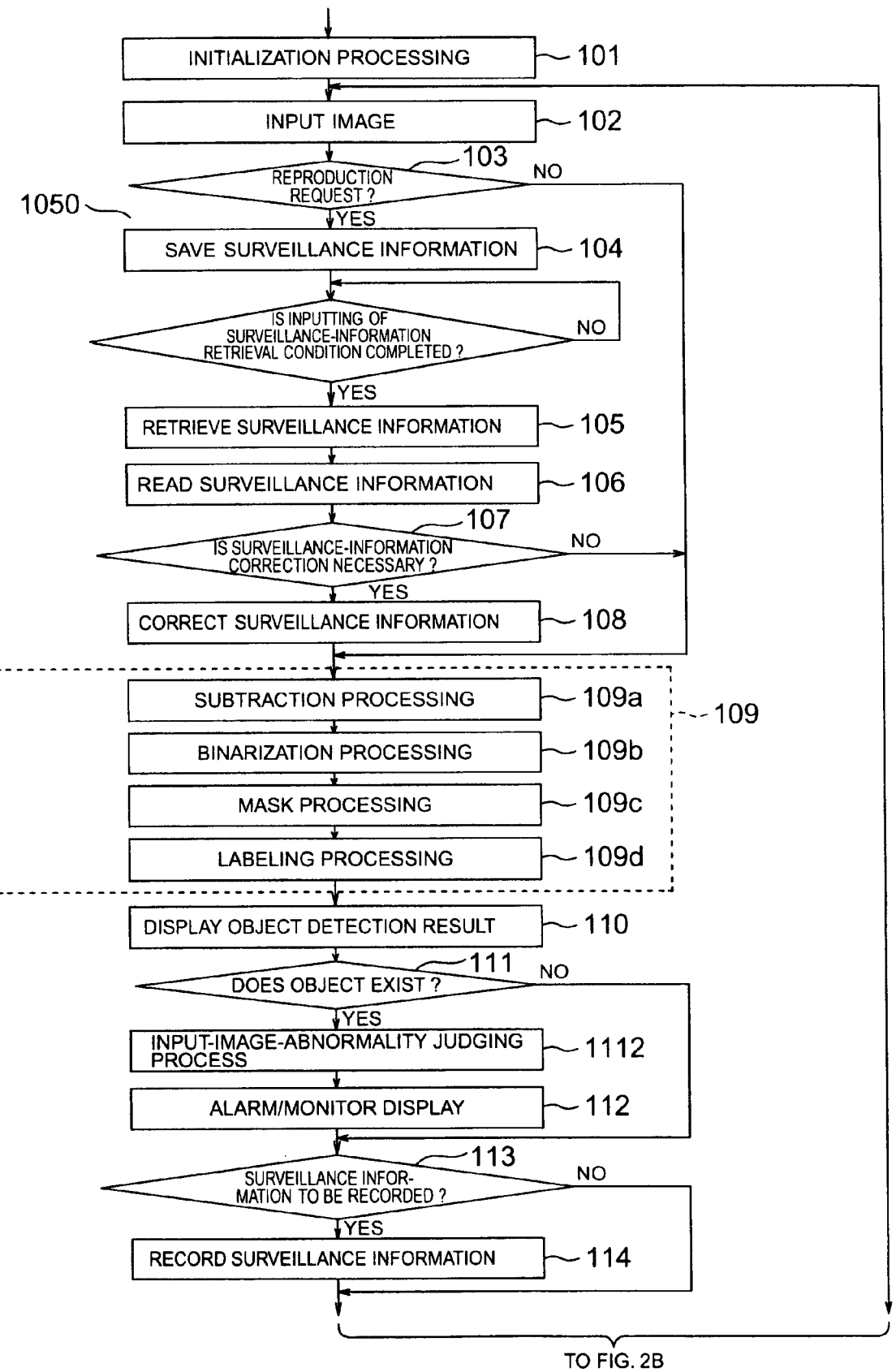

Hereinafter, referring to the drawings, the more detailed explanation will be given below concerning embodiments of the object detection method and an embodiment of the object detection apparatus according to the present invention. Incidentally, same reference numerals will be attached to same configuration members.

Figure 3:
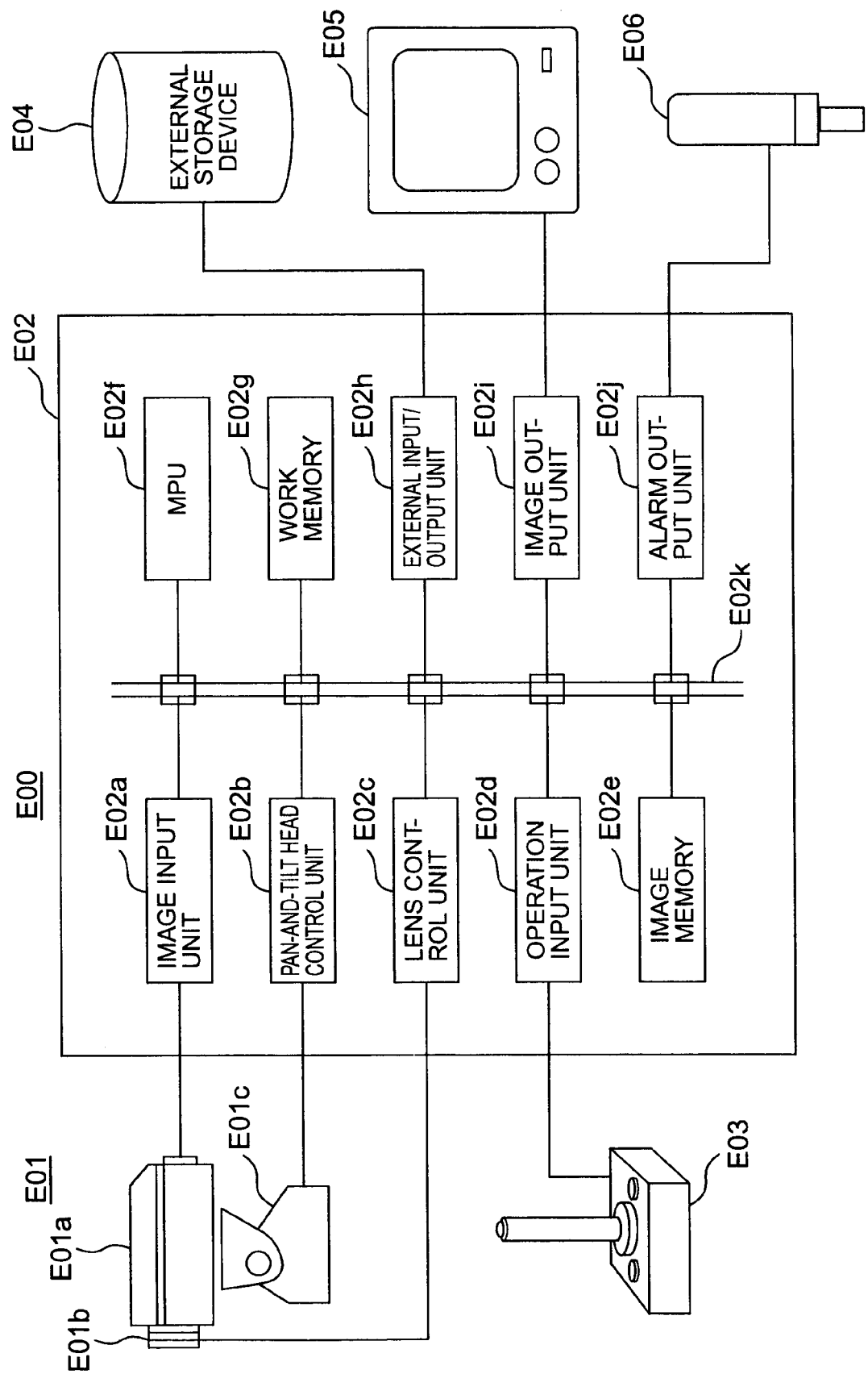
FIG. 3 is a diagram for illustrating one example of a surveillance system to which the embodiment of the present invention is applied.

FIG. 3 illustrates one example of the block configuration of a surveillance apparatus E00 to which the embodiment of the present invention has been applied. In this drawing, a numeral E01 denotes an image-pickup device, which, further, includes a TV camera E01$a$, a zoom lens E01$b$, and a camera pan-and-tilt head E01$c$ including an electric-motor-driven camera rotating base not shown.

A numeral E02 denotes a processing device, which, further, includes the following appliances: An image input unit E02$a$, a pan-and-tilt head control unit E02$b$, a lens control unit E02$c$, an operation input unit E02$d$, an image memory E02$e$, an MPU (micro processing unit) E02$f$, a work memory E02$g$, an external input/output unit E02$h$, an image output unit E02$i$, an alarm output unit E02$j$, and a data bus E02$k$. Moreover, the processing device E02 is combined with an operating device E03, an external storage device E04 including a hard disk drive and the like, an image monitor E05, and a warning lamp E06.

An output from the TV camera E01$a$ is connected to the data bus E02$k$ via the image input unit E02$a$. A control unit over the zoom lens E01$b$ is connected to the data bus E02$k$ via the lens control unit E02$c$. The electric-motor-driven rotating base of the camera pan-and-tilt head E01$c$ is connected to the data bus E02$k$ via the pan-and-tilt head control unit E02$b$. An output from the operating device E03 including a joystick and the like is connected to the data bus E02$k$ via the operation input unit E02$d$.

Also, the external storage device E04 is connected to the data bus E02$k$ via the external input/output unit E02$h$. The surveillance-purpose image monitor E05 is connected to the data bus E02$k$ via the image output unit E02$i$. The warning lamp E06 is connected to the data bus E02$k$ via the alarm output unit E02$j$. Meanwhile, the MPU E02$f$ and the work memory E02$g$ are connected to the data bus E02$k$ with no appliance therebetween.

Here, the TV camera E01$a$ captures a surveillance target within a predetermined field-of-view, then picking up the surveillance target and outputting the image signals. For this purpose, the TV camera E01$a$ includes the zoom lens E01$b$, and is mounted on the camera pan-and-tilt head E01$c$. In addition, the picked-up image signals are accumulated into the image memory E02$e$ from the image input unit E02$a$ via the data bus E02$k$.

The external storage device E04 exhibits a function of storing program data or the like. This program data or the like is read into the work memory E02$g$, as required. Conversely, the program data or the like is stored into the external storage device E04 from the work memory E02$g$.

The MPU E02$f$ executes the processing in accordance with the programs that have been stored in the external storage device E04 and that, when starting the surveillance operation, are loaded onto the work memory E02$g$. This execution allows the MPU E02$f$ to perform, within the work memory E02$g$, the analysis of the images accumulated into the image memory E02$e$.

Furthermore, in response to this processing result, the MPU E02$f$ exhibits the following functions: Controlling the zoom lens E01$b$ and the camera pan-and-tilt head E01$c$ thereby to change the field-of-view of the TV camera E01$a$, and, displaying the image of an intruding-object detection result on the surveillance-purpose monitor E05 and causing the warning lamp E06 to be lit up, as required. Additionally, such a surveillance apparatus may be used that has integrated therein the functions by the image-pickup device E01, the processing device E02, the external storage device E04, and the like. Thus, the configuration is not limited to the mode illustrated in FIG. 3.

Next, explanation will be given below regarding the embodiments of the object detection method. Here, any one of the embodiments that will be explained hereinafter operates based on the block configuration of the surveillance apparatus E00 explained in FIG. 3. At first, referring to FIG.

1, the explanation will be given below concerning a first embodiment of the present invention. Here, FIG. 1 illustrates the manipulation process in the first embodiment of the present invention, using a flowchart corresponding thereto.

This manipulation process in FIG. 1, at first, is started at an initialization processing step 101. Here, the initializations of the following regions are executed: An image-record-purpose image memory region used in the object detection processing and established within the image memory E02e, and a storage region used for variables, parameters (which will be described later) of surveillance information, and the like and established within the work memory E02g.

Next, at an image input step 102, the image signals picked up by the TV camera E01a are inputted via the image input unit E02a. This allows the acquisition of an input image of, e.g., 320 pixels in the transverse direction, 240 pixels in the longitudinal direction, and 8-bit data per pixel (namely, each pixel takes any one of 256-stage pixel values that range from 0 to 255).

Subsequently, at a reproduction-request judging step 103, a judgment is made concerning the presence or absence of a reproduction request to be made by the operator. For this purpose, a signal is checked which is inputted from the operating device E03 via the operation input unit E02d, thereby judging whether or not, e.g., a button provided on the operating device E03 has been pushed down. Incidentally, although, in FIG. 3, the joystick has been indicated as the example of the operating device E03, a keyboard or some other input unit may alternatively be used.

Furthermore, if the reproduction request is present, the processing goes to a surveillance-information saving step 104. Meanwhile, if the reproduction request is absent, the processing is branched into a subtraction processing step 109a. At this time, the surveillance-information saving step 104 and a surveillance-information reading step 106 subsequent thereto are skipped.

Incidentally, here, "the reproduction request is present" refers to the following operation: Temporarily storing surveillance information illustrated in FIG. 6B, which will be described later, into the memory in order for the operator to reproduce the surveillance information a predetermined time after. Accordingly, in the case of "the reproduction request is present" (i.e., YES), the processing goes to the surveillance-information saving step 104, then temporarily recording the surveillance information for the sake of an image processing a predetermined time-interval after (which will be described later). Meanwhile, in the case of "the reproduction request is absent" (i.e., NO), the surveillance information is directly inputted into an object detection processing step 109.

At the surveillance-information saving step 104, the present surveillance information, which becomes necessary in the manipulation process at the step 109 and a one at a step 111, is stored (: recorded) into the external storage device E04, thereby being saved. The pieces of surveillance information stored at this time are the parameters as indicated on a table 601 illustrated in FIG. 6A, e.g., the saving point-in-time, the saving condition, the input image, the reference background image, the masking image, the threshold value, the object detection conditions, and the like. Moreover, other various types of parameters are stored, as required. The more detailed explanation will be given later regarding the step 104.

Here, the saving point-in-time, which refers to a point-in-time at which the surveillance information had been saved, is recorded in each unit of year, month, day, hour, minute, and second. In addition, the frame number of the picked-up image is also recorded.

The saving condition refers to a condition under which the surveillance information had been saved. In the saving condition, as will be described later, the surveillance information is recorded which matches each saving condition, e.g., periodical saving case, saving case by object detection, and saving case of having been abnormal input image.

FIG. 6B indicates one example of the surveillance information recorded into the external storage device E04 in e.g., a table format.

Namely, the saving point-in-time indicates that an image with Frame No. 100 had been recorded on May 23, 2003 at 13:00:06. The saving condition is a periodical saving, which indicates that, e.g., one frame is recorded per hour. The input image indicates the input image (e.g., image of 320×240 pix and 8 bit/pix) acquired from the TV camera E01a at the image input step 102. The reference background image refers to a reference background image (e.g., image of 320×240 pix and 8 bit/pix) to be used at the subtraction processing step 109a which will be described later. The masking image refers to a masking image (e.g., image of 320×240 pix and 8 bit/pix) to be used at a mask processing step 109c which will be described later. The threshold value (20) refers to a binarized threshold value (which will be described later) to be used at a binarization processing step 109b. The object detection conditions refer to such conditions as the object's minimum area, maximum area, and size range to be used at an object-existence judging step 111 which will be described later. In addition, herein, a note on the surveillance information or the like can also be added.

Additionally, the minimum area refers to an area composed of, e.g., 50 pixels, and the maximum area refers to an area composed of, e.g., 5000 pixels. Also, the size range refers to a range in which the object's circumscribing rectangle falls in 5×10 to 50×100 pixels in the width×height directions (refer to FIG. 6B). Incidentally, the unit of the object detection conditions is pixel.

The reason why the present surveillance information is saved at the surveillance-information saving step 104 is to store the present surveillance information temporarily. This is because surveillance information that differs from the present surveillance information is read at the subsequent surveillance-information reading step 106.

At the subsequent surveillance-information reading step 106, the past surveillance information recorded in the external storage device E04 is read therefrom, then writing the read past surveillance information into the work memory E02g.

Incidentally, in the above-described embodiment, the explanation has been given regarding the case where the surveillance information is saved into the external storage device E04. The surveillance information, however, may also be recorded in a manner of being classified into the work memory E02g and the image memory E02e. For example, in FIG. 7 which will be described later, although the data on the parameters "input image", "background image", and "masking image" have been stored in the work memory E02g, the data on, e.g., "background image" and "masking image", may also be stored into the image memory E02e.

The subsequent object detection processing step 109 (i.e., the portion surrounded by a dashed line) is a processing for detecting an object to which the surveillance processing should be performed. This step 109 includes the subtraction processing step 109a, the binarization processing step 109b, the mask processing step 109c, and a labeling processing step 109d.

At the subtraction processing step 109a, a comparison is made between an input image and the reference background image on a pixel by pixel basis which have been recorded in the image memory E02e, then calculating the difference therebetween so as to acquire a subtraction image. Incidentally, if the judgment result at the reproduction-request judging step 103 has been found to be the absence of the reproduction request, the subtraction processing step 109 and subsequent process will be performed to the input image acquired from the TV camera E01a at the image input step 102.

At the binarization processing step 109b, the threshold-value processing is performed to the subtraction image on pixel by pixel basis which has been acquired now, thereby acquiring a binarized image. Explaining concretely, the binarized image is obtained in correspondence with the binarized threshold value held in the work memory E02g such that if a pixel value is smaller than the threshold value (i.e., an experimentally determined value falling within a range of 6 to 255, e.g., 20), the pixel value is set to be "0", whereas, if the pixel value is equal to or larger than the threshold value, the pixel value is set to be "255". This threshold-value processing allows the acquisition of the binarized image. Eventually, the binarized image acquired at this time indicates changed regions in the input image.

Figure 5A:
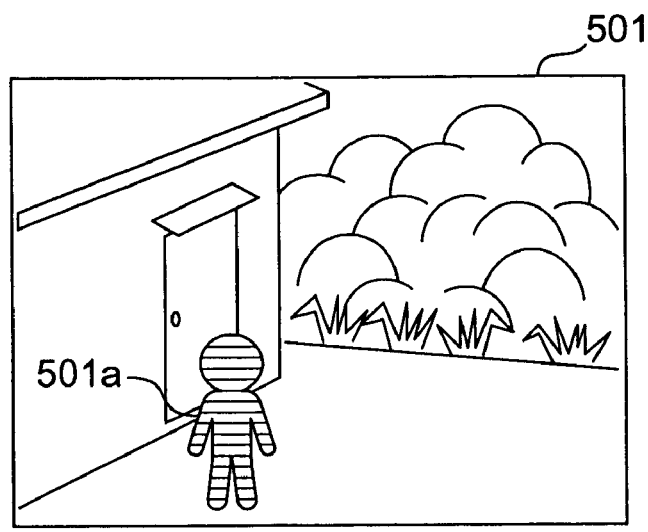
FIGS. 5A to 5C are the other explanatory diagrams for explaining the object detection operation by the subtraction method.
Figure 5B:
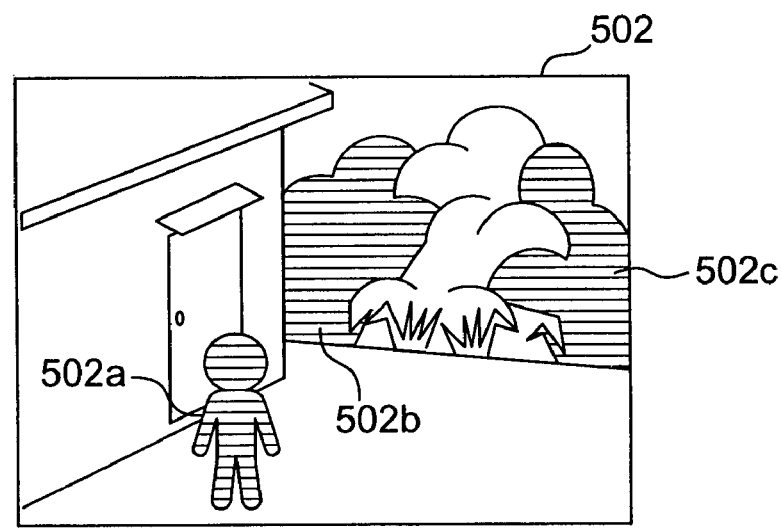
Figure 5C:
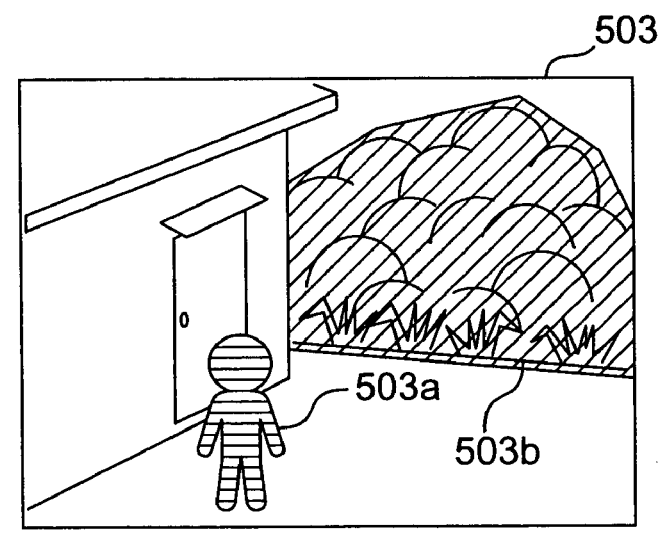

Next, at the mask processing step 109c, the mask processing explained in FIG. 5C is performed. Explaining concretely, at this mask processing step 109c, the pixel values in the changed region, which is detected as the binarized image within the masking image recorded in the image memory E02e, are changed from "255" to "0" (i.e., masked).

The execution of the mask processing like this makes it possible to eliminate a changed region from among changed regions detected by the binarized image. Here, the changed region is a region that has been detected within regions where there exist, e.g., grasses and trees, and that has been changed except the detection target.

Figure 4A:
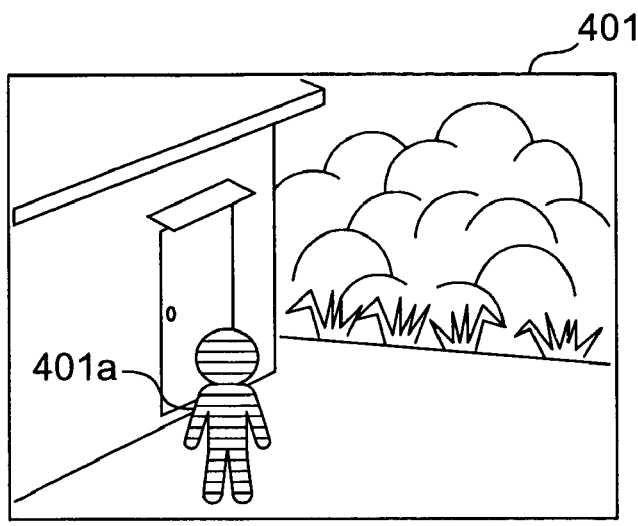
FIGS. 4A to 4C are explanatory diagrams for explaining an object detection operation by the subtraction method.
Figure 4B:
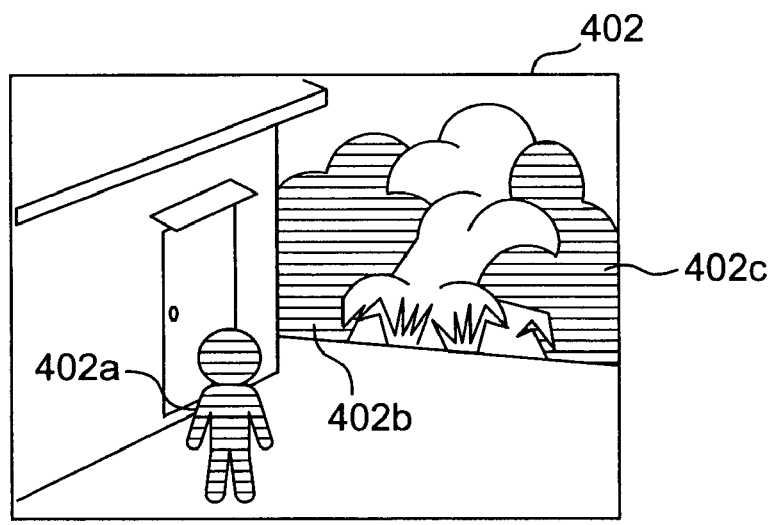
Figure 4C:
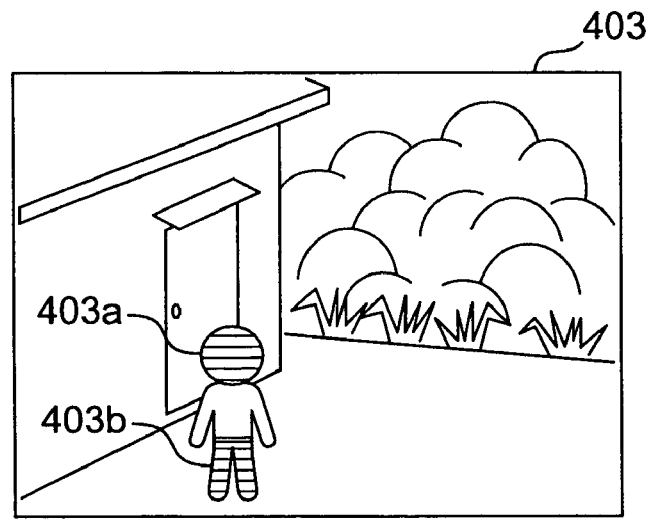

At the next labeling processing step 109d, clusters of the pixels which have the pixel value "255" within the binarized image are detected. Moreover, numbers are attached to the regions of these respective clusters, thereby making the cluster regions mutually distinguishable. For example, in FIG. 4B, numbers 1, 2, and 3 are attached to the regions 402a, 402b, and 402c, respectively.

Consequently, at this object detection processing step 109, if no surveillance-result reproduction request has been made at the reproduction-request judging step 103, the object detection processing is executed to the input image inputted at the image input step 102. Meanwhile, if the surveillance-result reproduction request has been made at the reproduction-request judging step 103, the processing is executed based on the parameters of the past surveillance information stored in the external storage device E04.

As a consequence, the operator finds it possible to make the judgment by switching appropriately between the following surveillance results: The surveillance result acquired by the object detection processing with respect to the present input image, and the surveillance result acquired by operating the operating device E03 on the basis of the past surveillance information recorded in the external storage device E04.

Next, at an object-detection-result displaying step 110, e.g., the intruding object detected at the object detection processing step 109 is superimposed on the input image, then being supplied to the output image monitor E05 via the image output unit E02i so as to be displayed thereon. As the display mode of the intruding object superimposed on the input image, the following various types of modes are possible: The binarized image itself of the intruding object acquired at the step 109, or its circumscribing rectangle, or, if the intruding object is a human, a triangle mark is attached over his or her head, or the human is color-displayed, or the like.

At the subsequent object-existence judging step 111, it is checked whether or not, of the clusters of the pixels which have the pixel value "255" within the binarized image and to which the numbers have been attached at the labeling processing step 109d, there exists a cluster that, based on the predetermined object detection conditions, can be judged to be an object that should be detected. If there exists such a cluster, the processing goes to an input-image-abnormality judgment processing step 1112. Meanwhile, if there exists no such cluster, the processing is branched into a surveillance-information record judging step 113, and the input-image-abnormality judgment processing step 1112 and an alarm/monitor displaying step 112 are skipped.

At this time, at the object-existence judging step 111, the above-described object detection conditions based on which the cluster can be judged to be the object that should be detected include "minimum area", "maximum area", "size range", and the like in the parameters of the surveillance information. At this step 111, a cluster of the pixels having the pixel value "255" within the binarized image is compared with the "minimum area", "maximum area", "size range", and the like. Then, if the area (i.e., the number of the pixels) of this cluster of the pixels falls in a range of the minimum area (e.g., 50 pixels) to the maximum area (e.g., 5000 pixels), or, if the circumscribing rectangle's size of this cluster of the pixels falls within a predetermined range (e.g., range of 5×10 to 50×100 pixels in the width×height), this cluster of the pixels is judged to be the object that should be detected. Namely, it is judged that there exists the intruding object.

Next, at the input-image-abnormality judgment processing step 1112, if, based on the parameters recorded in the surveillance information, the area of the cluster of the pixels having the pixel value "255" within the binarized image and the size of the cluster of the pixels have been found to be larger than the maximum area and the size range, respectively, this situation is judged to be an input image abnormality (i.e., there exists a tremendous difference between the input image and the reference background image).

Incidentally, the judgment on the abnormality/normality of the input image may also be performed based on a ratio of the area of the cluster of the pixels having the pixel value "255" within the binarized image with respect to the area of the detection target region within the input image. Referring to FIGS. 8A to 8D, explanation will be given below concerning this method.

FIG. 8A illustrates an example of the input image, where images of a house and a tree are picked up on an input image 801 and a masking region is set on a leaf portion 802 surrounded by a dashed line. Namely, a region except the masking region becomes a detection target region. Let the area of the input image 801 be equal to S0. FIG. 8B indicates the masking region 802, and a hatched region other than that, i.e., the detection target region 803. Let the area of the detection target region 803 and that of the masking region 802 be equal to S1 and S2, respectively. FIG. 8C illustrates an example of the binarized image detected from the input image 801, where a hatched region 804 indicates a cluster of the pixels having the pixel value "255" within the binarized image, i.e., the object to be detected. Let the area of the region 804 be equal to S4. FIG. 8D is a diagram for explaining the judgment on the abnormality/normality of the input image.

In FIG. 8D, assuming that the input image 801 is a 320-pixel (width)×240-pixel (height) image, its area S0 is as follows:

$$S0=320 \text{ (pixels)} \times 240 \text{ (pixels)}.$$

The area of the detection target region 803, i.e., S1, is determined in the following way:

$$S1=S0-S2.$$

The area of a region that occupies a predetermined proportion, e.g., 10%, of the area of the detection target region 803 is set to be A. Namely, $$A=0.1 \times S1.$$

The judgment on the abnormality/normality of the input image is performed based on a comparison result between the area of the object to be detected, i.e., S4, and A. Namely, S4>A . . . the input image is abnormal, and, S4=A, otherwise S4<A . . . the input image is normal.

The setting-up of the judging step 1112 like this makes it possible to perform the judgment on the abnormality of the input image.

At the alarm/monitor displaying step 112, e.g., the image of the object thus detected is displayed on the output monitor E05, and the warning lamp E06 is caused to be lit up, thereby giving a notice for indicating that there exists the intruding object. Also, a notice for indicating the input image abnormality may also be given simultaneously.

Next, at the surveillance-information record judging step 113, it is judged whether or not recording the surveillance information is necessary. At this time, if there appears at least one event of the following cases, recording the surveillance information is judged to be necessary: The case where the intruding object has been detected, the case where the input image has become abnormal, and the case where, in the ordinary surveillance, it has come to a predetermined point-in-time, e.g., an 1-hour time-interval has elapsed.

Moreover, if recording the surveillance information has been judged to be necessary, the processing goes to a surveillance-information recording step 114. Meanwhile, if recording the surveillance information has been judged to be unnecessary, the processing is branched into a surveillance-information restoration judging step 115, and the surveillance-information recording step 114 is skipped.

Additionally, when the processing is under way which is about the case where the reproduction request had been judged to be present at the step 103, it is unnecessary to re-record the surveillance information read at the step 106 into the external storage device E04.

Here, at the surveillance-information recording step 114, the surveillance information recorded in the work memory E02g and the image memory E02e is recorded into the external storage device E04 in e.g., a memory table format.

Next, at the surveillance-information restoration judging step 115, if, at the surveillance-information saving step 104, the surveillance information had been saved into the external storage device E04, the processing goes to a surveillance-information restoring step 116. On the other hand, if the surveillance information had not been saved therein, the processing is branched into the image input step 102, and the surveillance-information restoring step 116 is skipped.

At the surveillance-information restoring step 116, the surveillance information saved into the external storage device E04 at the step 104 is read therefrom, then being written into the work memory E02g.

When the surveillance-information restoring step 116 has been finished, the processing goes back to the image input step 102, and then the same processings are repeated.

Here, referring to FIG. 7, further explanation will be given below concerning the processing in the first embodiment in the case where the reproduction request had been found to be present at the step 103, focusing mainly on the surveillance-information saving step 104, the surveillance-information reading step 106, and the surveillance-information restoring step 116. FIG. 7 illustrates the flow of the surveillance information between, e.g., the work memory E02g and the external storage device E04.

When the reproduction request is made at the step 103, one set of surveillance information 1100a at that point-in-time (in an example in FIG. 7, May 26, 2003 at 10:05:23 and Frame No. 15) is saved (i.e., stored) into the external storage device E04 at the step 104. This one set of surveillance information includes one set of data, e.g., "input image", "background image", "masking image", "binarized threshold value", and the like. Incidentally, although, in FIG. 7, this one set of information has been indicated in a simplified manner, the more detailed one is just as indicated in, e.g., FIG. 6B. After the information 1100a has been stored into the external storage device E04 at the step 104, at the step 106, one set of past surveillance information 1100b stored in the external storage device E04 is read out from the external storage device E04, then being written into the work memory E02g. Moreover, with respect to the information 1100b thus written, the following processing is carried out: The object detection processing step 109, the object-detection-result displaying step 110, the object-existence judging step 111, the alarm/monitor displaying step 112, the surveillance-information restoration judging step 115, and the surveillance-information restoring step 116. At the surveillance-information restoration judging step 115, since, at the step 104, the surveillance information had been saved into the external storage device E04, the processing goes to the surveillance-information restoring step 116. At the step 116, one set of surveillance information at a point-in-time (e.g., May 26, 2003 at 10:10:10 and Frame No. 100), which had been saved into the external storage device E04 at the step 104, is read out, then being stored into the work memory E02g again. Furthermore, in order to continue to perform the processing at the step 102 or thereinafter to the stored surveillance information, the processing is restored back to the image input step 102. The execution of the processing like this makes it possible to restart the ordinary surveillance that has been interrupted because of the processing for the reproduction request.

The execution of the processings described so far allows the surveillance result to be reproduced based on the surveillance information recorded into the external storage device E04. This, further, makes it possible to reproduce, at a predetermined point-in-time, a surveillance result prior thereto.

Namely, the embodiment in FIG. 1 allows the surveillance result, which had been acquired at the time when there actually occurred a false or erroneous detection of an object, to be easily reproduced at a predetermined point-in-time subsequent thereto. As a consequence, the operator finds it possible to make the judgment accurately as to whether or not the setting of the surveillance-information parameters is proper. This can be done by simply operating the operating device E03 at the predetermined point-in-time, using the reproduced false-detection result of the object (e.g., despite the fact that there existed an intruder, the intruder was not detected).

Consequently, according to the embodiment in FIG. 1, it becomes possible to check whether or not the surveillance system has been properly operating all the time without the necessity for the operator to always be present at the system.

Next, referring to FIG. 2A and FIG. 2B, the explanation will be given below concerning a second embodiment of the present invention. FIG. 2A and FIG. 2B illustrate a flowchart for explaining the manipulation process according to the second embodiment of the present invention.

The embodiment illustrated in FIG. 2A and FIG. 2B results from adding the following steps to the flowchart of the embodiment illustrated in FIG. 1: A surveillance-information retrieval-condition input completion judging step 1050 and a surveillance-information retrieving step 105 are added between the surveillance-information saving step 104 and the surveillance-information reading step 106. A surveillance-information correction judging step 107 and a surveillance-information correcting step 108 are added between the surveillance-information reading step 106 and the subtraction processing step 109a within the object detection processing step 109. A processing-result record judging step 1141 and a processing-result recording step 1142 are added between the step 114 and the step 115. Moreover, a surveillance-information update necessity judging step 117 and a surveillance-information updating step 118 are added after the surveillance-information restoring step 116.

Furthermore, steps other than these steps are the same as the ones in the first embodiment explained in FIG. 1. Accordingly, explanation will be given below placing emphasis on the added steps, and the explanation regarding the other steps will be omitted.

At first, at the surveillance-information retrieval-condition input completion judging step 1050, it is judged whether or not the operator has completed the inputting of a retrieval condition for retrieving the surveillance information. The operation of the operating device E03, for example, enables the operator to retrieve the saving point-in-time, the saving condition, or the like with respect to the surveillance system. Also, the use of a predetermined button enables the operator to notify the surveillance system of the completion of the retrieval-condition inputting. At the surveillance-information retrieval-condition input completion judging step 1050, if the inputting of the surveillance-information retrieval condition has been not completed, the processing goes back again to the surveillance-information retrieval-condition input completion judging step 1050 (i.e., the processing is looped until the inputting has been completed). On the other hand, if the inputting of the surveillance-information retrieval condition has been completed, the processing goes to the surveillance-information retrieving step 105. At the surveillance-information retrieving step 105, from among the plural pieces of surveillance information recorded in the external storage device E04, surveillance information is retrieved which matches at least one of a predetermined saving point-in-time (e.g., time range from the present point-in-time to one week ago, frame number, or the like), and a predetermined saving condition (e.g., saving at the time of object detection, or the like). As described above, the operator appropriately selects the retrieval condition at this time, then inputting the retrieval condition by using the operating device E03.

Here, if plural pieces of surveillance information have matched an inputted retrieval condition and have been retrieved accordingly, the most newly recorded surveillance information, for example, may be selected. Also, if there exists none of the surveillance information that have matched the inputted retrieval condition, surveillance information that is closest to the inputted retrieval condition may be selected.

Incidentally, the retrieval is not limited to the above-described form. It may be possible, e.g., to cause the monitor E05 to display an at-a-glance list of the plural pieces of surveillance information recorded in the external storage device E04, and then to request the operator to select desired surveillance information from among the at-a-glance list.

Next, at the surveillance-information reading step 106, the surveillance information retrieved at the surveillance-information retrieving step 105 is read from the external storage device E04. Moreover, the contents of the read surveillance information are written into the work memory E02g.

Next, at the surveillance-information correction judging step 107, it is judged whether or not the operator has made a correction request for correcting the parameters in the surveillance information stored in the work memory E02g. The use of the operating device E03, for example, enables the operator to instruct the processing device E02 whether or not to make the corrections. If the correction request has been judged to be present, the processing goes to the surveillance-information correcting step 108. Meanwhile, if the correction request has been judged to be absent, the processing is branched into the subtraction processing step 109a, and the surveillance-information correcting step 108 is skipped.

The judgment at the surveillance-information correction judging step 107 at this time is performed by the operator. The judged result is inputted from, e.g., the operating device E03.

Moreover, at the surveillance-information correcting step 108, the corrections are made based on the values inputted by the operator from the operating device E03. Here, examples of the corrections are, e.g., increasing, by 5 points, the value of "binarized threshold value" in the parameters of the surveillance information illustrated in FIG. 6A, and the like. Additionally, the parameters of the surveillance information corrected at the step 108 are separately recorded into the work memory E02g for a processing at the surveillance-information reflecting step 118 which will be described later.

As a consequence, the object detection processing at the steps ranging from the object detection processing step 109 to the surveillance-information restoring step 116 will be executed based on the corrected parameters of the surveillance information. At the surveillance-information restoring step 116, as was explained in association with the first embodiment, the surveillance information saved into the external storage device E04 at the step 104 is read therefrom, then being written into the work memory E02g.

Next, at the surveillance-information update necessity judging step 117, it is judged whether or not the operator has made a update request that the corrected results acquired at the surveillance-information correcting step 108 be updated onto the surveillance information in the ordinary surveillance processing thereinafter. Since, e.g., an input box for selecting between update necessary and not necessary is displayed on the monitor E05, the operation of the operating device E03 enables the operator to notify the processing device E02 of whether the updating is necessary or unnecessary. If the update request for updating the corrected parameters of the surveillance information has been found to be present, the corrected parameters of the surveillance information are updated at the surveillance-information updating step 118. Namely, the corrected results acquired at the step 108 and recorded separately in the work memory E02g are updated onto the parameters of the present surveillance information. After that, the processing goes back to the image input step 102, and the series of processings at the step 102 or thereinafter are performed to an input image with the employment of the corrected parameters. Meanwhile, if the update request has been found to be absent, the processings at the step 102 or thereinafter are performed thereto with the employment of the previous parameters. Consequently, it becomes possible to execute the accurate detection of an intruding object under the setting by the operator of the proper parameters such as the binarized threshold value. Incidentally, if, at the surveillance-information correcting step 108, no corrections had been made with respect to the surveillance-information parameters (e.g., masking image and binarized threshold value), the processings at the step 117 and the step 118 are skipped.

Here, explanation will be given below concerning the processing-result record judging step 1141 and the processing-result recording step 1142. At the processing-result record judging step 1141, it is judged whether or not processing results should be recorded. Here, the processing results refer to, e.g., information as to whether or not the object to be detected has been judged to exist at the object-existence judging step 111, and information as to whether or not the input image has been judged to be abnormal at the input-image-abnormality judgment processing step 1112. For example, in the case of a setting where the processing results are recorded on 5-frame basis, at the step 1141, it is judged whether or not, based on the frame numbers of the input images, the present frame is a one whose processing results should be recorded. In the case of recording the processing results, the processing goes to the step 1142. Meanwhile, in the case of not recording the results, the processing is branched into the step 115. Additionally, when the processing is under way which is about the case where the reproduction request had been judged to be present at the step 103, the step 1141 and the step 1142 are skipped. Incidentally, the setting is not limited to the one where the processing results are recorded periodically, e.g., on 5-frame basis. For example, such a setting may alternatively made where the processing results are recorded only when the object to be detected has been judged to exist.

Next, at the processing-result recording step 1142, e.g., a record 901 illustrated in FIG. 9 is created from the surveillance information recorded in the work memory E02g and the image memory E02e, and the above-described processing results in the processing steps. Moreover, the record 901 is stored into the external storage device E04 via the external input/output unit E02h, thereby making it possible to display the record 901 on the monitor E05, as required. The record 901 in FIG. 9 records the frame numbers of the input images with 5-frame interval and the presence or absence (which had been judged at the step 111) of the intruder within each input image. The record 901 indicates that the intruder has been detected in the frame numbers 5, 10, 15, 20, 35, and 40, and indicates that there exists no intruder in the frame numbers 25 and 30. On the monitor E05 at an arbitrary point-in-time, the operator can make reference to the information stored in the record 901. This allows the operator to recognize information that the intruder detection conditions may be incomplete and thus there may be need of adjusting the parameters. Namely, the operator makes reference to the record 901 illustrated in FIG. 9, thereby performing the following tasks: Confirming whether or not the intruder detection conditions are incomplete in the frame numbers 25 and 30 in which the intruder has changed from "presence" to "absence", and then adjusting the parameters if necessary. In this case, it is all right for the operator to input "frame numbers 25, 30" as the retrieval condition at the time of the above-described step 1050. In this way, the operator makes reference to the record 901, which permits the operator to know whether or not there is need of adjusting some surveillance-information parameter, e.g., the level of the binarized threshold value. Additionally, the record is not limited to the application to the intrusion detection. Alternatively, it is also possible to create the record similarly for the input image abnormality, and to record the created record into the external storage device E04.

Also, at the processing-result recording step 1142, it is alternatively possible to record, as the processing result, e.g., the image that had been displayed at the above-described object-detection-result displaying step 110 and that results from superimposing the detected intruding object on the input image. When recording the image displayed at the object-detection-result displaying step 110, it is possible to cause a past processing-result image (e.g., the image resulting from superimposing the detected intruding object on the input image) without performing the processings at the above-described steps 109, 110, and 111 on the basis of the past surveillance information recorded into the external storage device E04.

Figure 10:
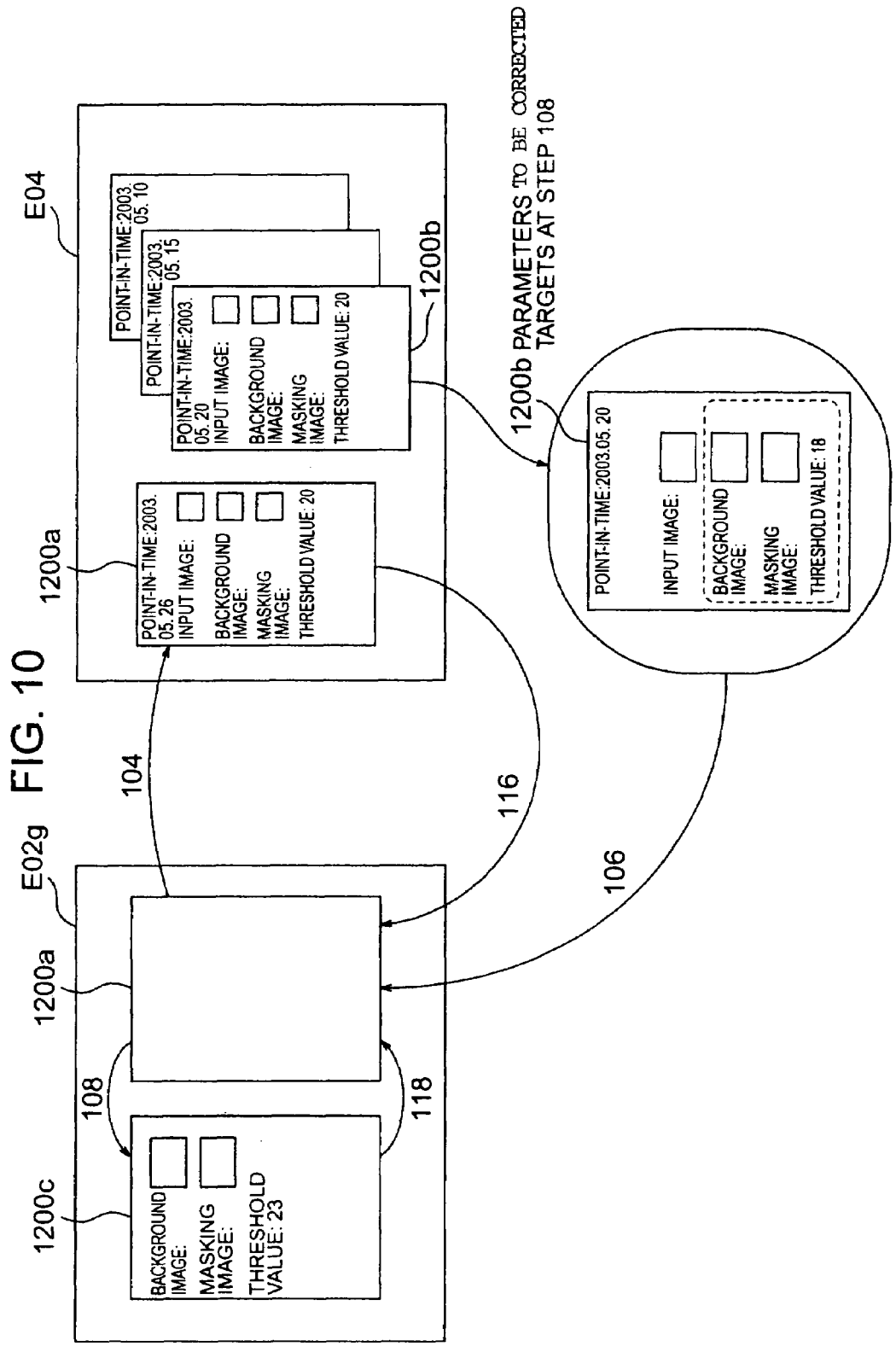
FIG. 10 is a diagram for explaining the transfer situation of the information in the one embodiment of the present invention.

Referring to FIG. 10, further explanation will be given below concerning the processings in the second embodiment, focusing mainly on the steps 104, 106, 108, 116, 117, and 118. FIG. 10 illustrates the transfer situation of the surveillance information between the work memory E02g and the external storage device E04.

When the reproduction request has been made at the step 103, one set of surveillance information 1200a at that point-in-time (in an example in FIG. 10, May 26, 2003 at 10:10:10 and Frame No. 25) is saved (i.e., stored) into the external storage device E04 at the step 104. After that, at the step 106, one set of surveillance information 1200b that the operator desires is read from among the past surveillance information stored in the external storage device E04, then being written into the work memory E02g. At this time, if the operator has made a correction request for correcting the surveillance information, parameters of the surveillance information, which are correction targets, are corrected at the step 108. Moreover, with respect to the information 1200b written into the work memory E02g, the following processings are carried out: The object detection processing step 109, the object-detection-result displaying step 110, the object-existence judging step 111, the input-image-abnormality judgment processing step 1112, the alarm/monitor displaying step 112, the surveillance-information record judging step 113, the surveillance-information recording step 114, the surveillance-information restoration judging step 115, and the surveillance-information restoring step 116. At the surveillance-information restoration judging step 115, since, at the step 104, the surveillance information had been saved into the external storage device E04, the processing goes to the surveillance-information restoring step 116. At the step 116, the one set of surveillance information 1200a that had been saved into the external storage device E04 at the step 104 is read out, then being stored into the work memory E02g again. At that time, at the update necessity judging step 117 for judging whether the surveillance information is to be rewritten into corrected-surveillance-information, it is judged whether or not the operator has made a request that the intruding-object surveillance thereinafter be carried out with the employment of the surveillance-information parameters corrected at the step 108. If the operator has made the request, at the rewriting step 118 for rewriting into corrected-surveillance-information, the surveillance-information parameters are rewritten into the values corrected at the step 108. Subsequently, in order to continue to perform the processings at the step 102 or thereinafter to the surveillance information 1200*a* stored into the work memory E02*g*, the processing is restored back to the image input step 102. The execution of the processings like this makes it possible to restart the ordinary surveillance that has been interrupted because of the processing for the reproduction request.

As a consequence, the operator finds it possible to arbitrarily retrieve, at an arbitrary point-in-time, necessary and appropriate surveillance information from among the plural pieces of surveillance information recorded in the external storage device E04, and to acquire a surveillance result while adjusting the parameters of the surveillance information. This allows the operator to easily perform the accurate adjustment task of the parameters.

Consequently, this embodiment illustrated in FIG. 2A and FIG. 2B also allows the performance of the surveillance system to be maintained all the time under the setting of the proper parameters and without the necessity for the operator to always be present at the system. This makes it possible to easily configure a high-reliability surveillance system.

Figure 12A:
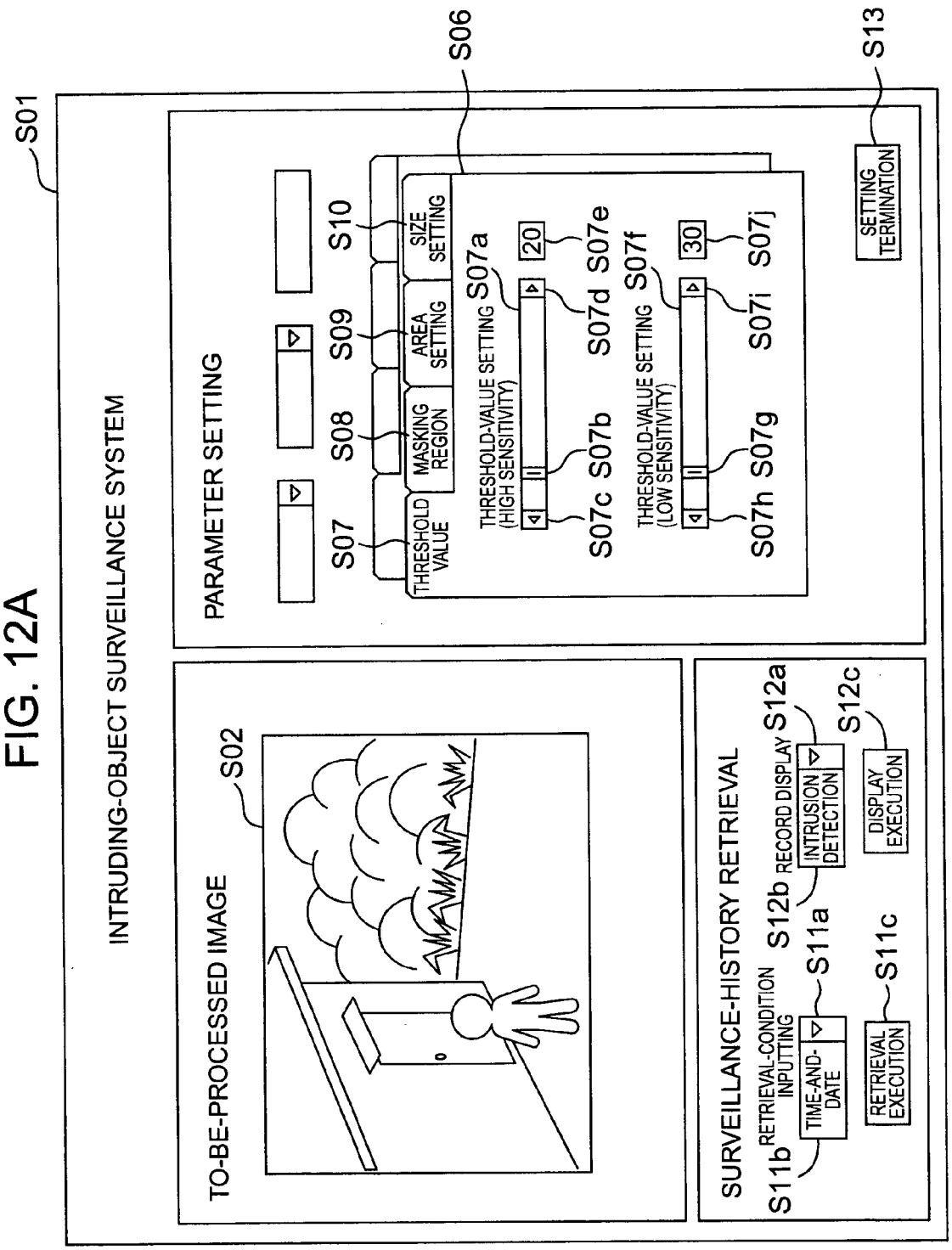
FIG. 12A and FIG. 12B are diagrams for illustrating an example of the parameter setting operation by an operator in the one embodiment of the present invention.
Figure 12B:
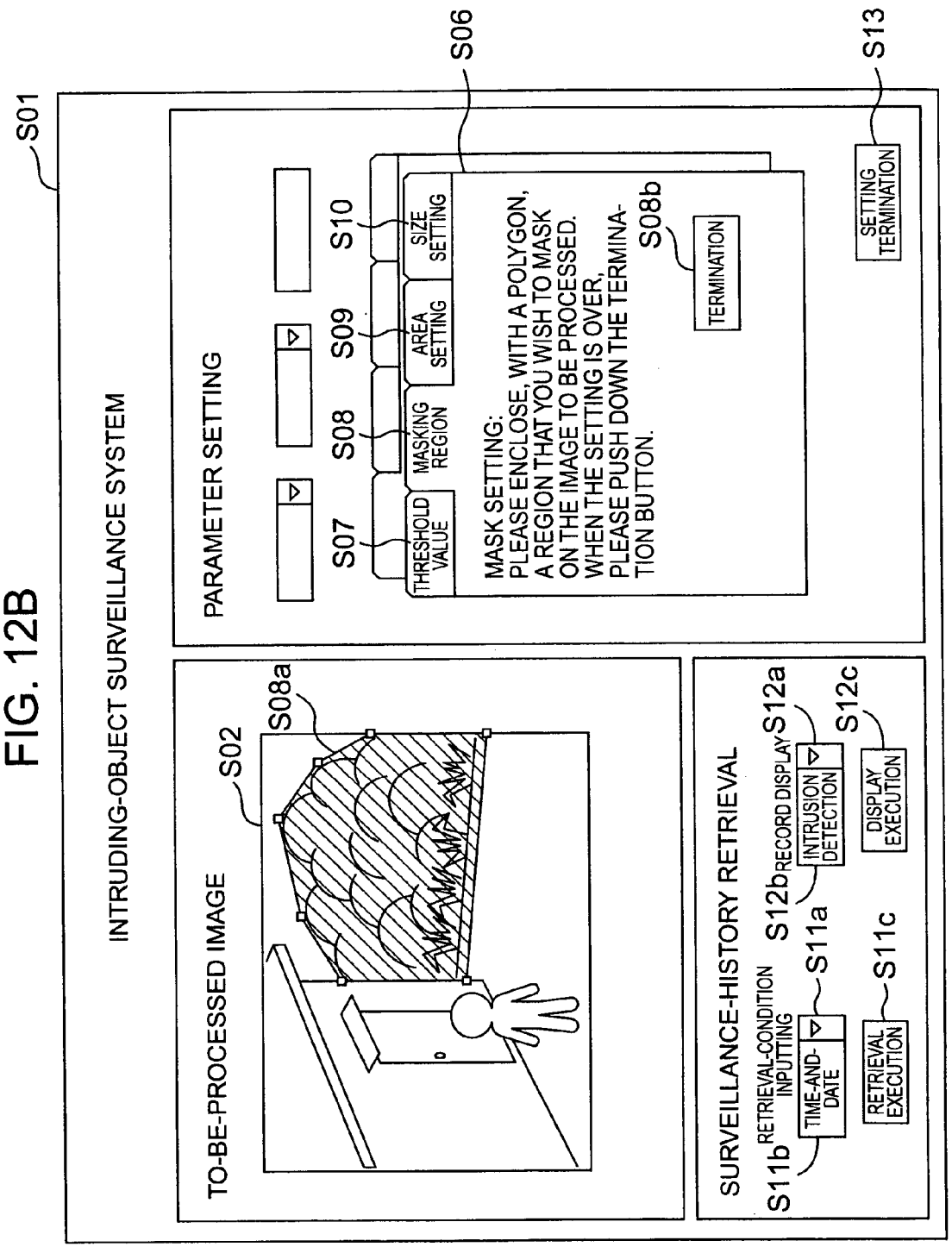

Referring to FIG. 12A and FIG. 12B, explanation will be given below regarding an example of the parameter setting operation performed by the operator in the second embodiment. FIG. 12A illustrates an example of the threshold-value setting picture displayed on the monitor E05. Also, FIG. 12B illustrates an example of the masking-region setting picture displayed thereon. In FIG. 12A, a setting picture S01 includes the following configuration components: A display picture S02 for displaying an input image into the processing device E02, a masking image, an image resulting from superimposing a processing result on the input image, and the like, a tab menu S06 for setting the surveillance-information parameters, a list box (pull-down menu) S11*a* for selecting a retrieval condition for reading the surveillance-information parameters recorded in the external storage device E04, a retrieval execution button S11*c* for executing the retrieval of the surveillance information with the use of the retrieval condition selected using the list box S11*a*, a list box S12*a* for selecting the type (e.g., intrusion detection and input image abnormality) of the record 901 illustrated in FIG. 9, a display execution button S12*c* for displaying a record selected using the list box S12*a*, and a setting termination button S13 for terminating the setting operation of the surveillance-information parameters. On the setting picture S01, the tab menu S06 includes therein tabs for displaying set items such as the threshold value, the masking region, the area setting, and the size setting. Specifying, e.g., a threshold-value setting tab S07 using the operating device E03 displays threshold-value setting items (which will be described later), and specifying, e.g., a masking-region setting tab S08 displays masking-region setting items (which will be described later). Here, a retrieval condition is selected using the list box S11*a* for selecting a retrieval condition for reading the surveillance-information parameters recorded in the external storage device E04. This displays the name of the selected retrieval condition in a text field S11*b*, and also displays an input box (not illustrated) for inputting details of the retrieval condition. Next, the operator inputs the retrieval condition, then specifying the retrieval execution button S11*c* using the operating device E03. This causes surveillance-information parameters, which have been recorded in the external storage device E04 (and have matched the retrieval condition), to be read into the work memory E02*g*, thereby making it possible to confirm the details of the surveillance-information parameter on the display picture S02 and the tab menu S06. Also, the type of the record is selected using the list box S12*a* for selecting the type of the record 901, which displays the name of the selected record in a text field S12*b*. The display execution button S12*c* is specified using the operating device E03, which displays, on the monitor E05, the record stored in the external storage device E04 (not illustrated). Also, specifying the setting termination button S13 terminates the setting operation of the surveillance-information parameters.

FIG. 12A illustrates the setting picture in a case where, in the tab menu S06, the threshold-value setting tab S07 has been specified using the operating device E03. On this setting picture, it has been made possible to set two types of threshold values, e.g., a high-sensitivity threshold value and a low-sensitivity one. Here, the high sensitivity refers to, generally, a state where the threshold value has been set to be small in order to detect a smaller image change. For example, when the operator wishes to detect a change even if it is small, the operator uses the high-sensitivity threshold value. Meanwhile, in the opposite case, the operator uses the low-sensitivity threshold value. When setting the high-sensitivity threshold value, the operator uses a slide bar S07*a*, a slide S07*b*, slide bar increment/decrement buttons S07*c* and S07*d*, and an input field S07*e*. When the slide S07*b* has been moved in a right or left direction using the operating device E03, the threshold value is incremented or decremented in correspondence with a quantity by which the slide S07*b* has been moved. As a result of this operation, the value of the threshold value is displayed in the input field S07*e*. Also, when specifying the threshold-value increment/decrement button S07*c* using the operating device E03, the threshold value is decremented, e.g., one by one. As a result of this operation, the slide S07*b* is drawn at a position corresponding to the threshold value, and the value of the threshold value is displayed in the input field S07*e*. Furthermore, when, similarly, specifying the threshold-value increment/decrement button S07*d* using the operating device E03, the threshold value is incremented, e.g., one by one. As a result of this operation, the slide S07*b* is drawn at a position corresponding to the threshold value, and the value of the threshold value is displayed in the input field S07*e*. Also, if a to-be-specified value of the threshold value has been known in advance, the value may also be directly inputted into the input field S07*e*. In this case, the slide S07*b* is drawn at a position corresponding to the threshold value. Concerning the low-sensitivity threshold value as well, similarly to the above-described operation, the operator uses a slide S07*g*, slide bar increment/decrement buttons S07*h* and S07*i*, and an input field S07*j*, thereby making it possible to set the low-sensitivity threshold value. This, eventually, makes it possible to correct the threshold-value parameter of the surveillance information in the work memory E02*g*.

FIG. 12B illustrates the setting picture in a case where, in the tab menu S06, the masking-region setting tab S08 has been specified using the operating device E03. Here, the explanation will be omitted regarding the configuration components to which the same reference numerals as the ones in FIG. 12A have been attached, since these components exhibit basically the same functions. In FIG. 12B, the masking-region setting operation is performed with respect to the display picture S02 where, e.g., the input image has been displayed using the operating device E03. The masking region is expressed by a polygon such as a masking region S08a. By specifying vertex points of the polygon using the operating device E03, coordinates of the vertex points continue to be gradually stored into the work memory E02g. As illustrated in FIG. 12B, the masking region is displayed in a state of being superimposed on the input image. This condition makes it possible to easily grasp a position relationship between the input image (i.e., surveillance region) and the masking region. In addition, when terminating the setting of the masking region, a termination button S08b is specified using the operating device E03. At this time, the polygon is calculated from the coordinates of the vertex points which have been stored into the work memory E02g until this time, then setting this polygonal region into the work memory E02g as the masking region.

Incidentally, in the above-described embodiments, the explanation has been given regarding the case where the past surveillance result is reproduced on the basis of the past surveillance information recorded into the external storage device E04. As another embodiment, however, it is also possible to perform the adjustment task of the parameters by performing the object detection processing on the basis of the past surveillance information and the present surveillance information recorded in the work memory E02g. For example, it is also possible to perform, to the past input images recorded in the external storage device E04, the object detection processing with the employment of the threshold value, the masking image, and the like that are set into the work memory E02g at present.

Next, referring to FIG. 11A and FIG. 11B, explanation will be given below concerning a third embodiment of the present invention.

The present embodiment is an intruding-object surveillance method where the ordinary intruding-object detection processing and the adjustment processing of the surveillance-information parameters are performed independently in a manner of being separated. FIG. 11A illustrates the ordinary intruding-object detection processing flow, and FIG. 11B illustrates the processing flow at the time of the parameter adjustment.

Figure 11A:
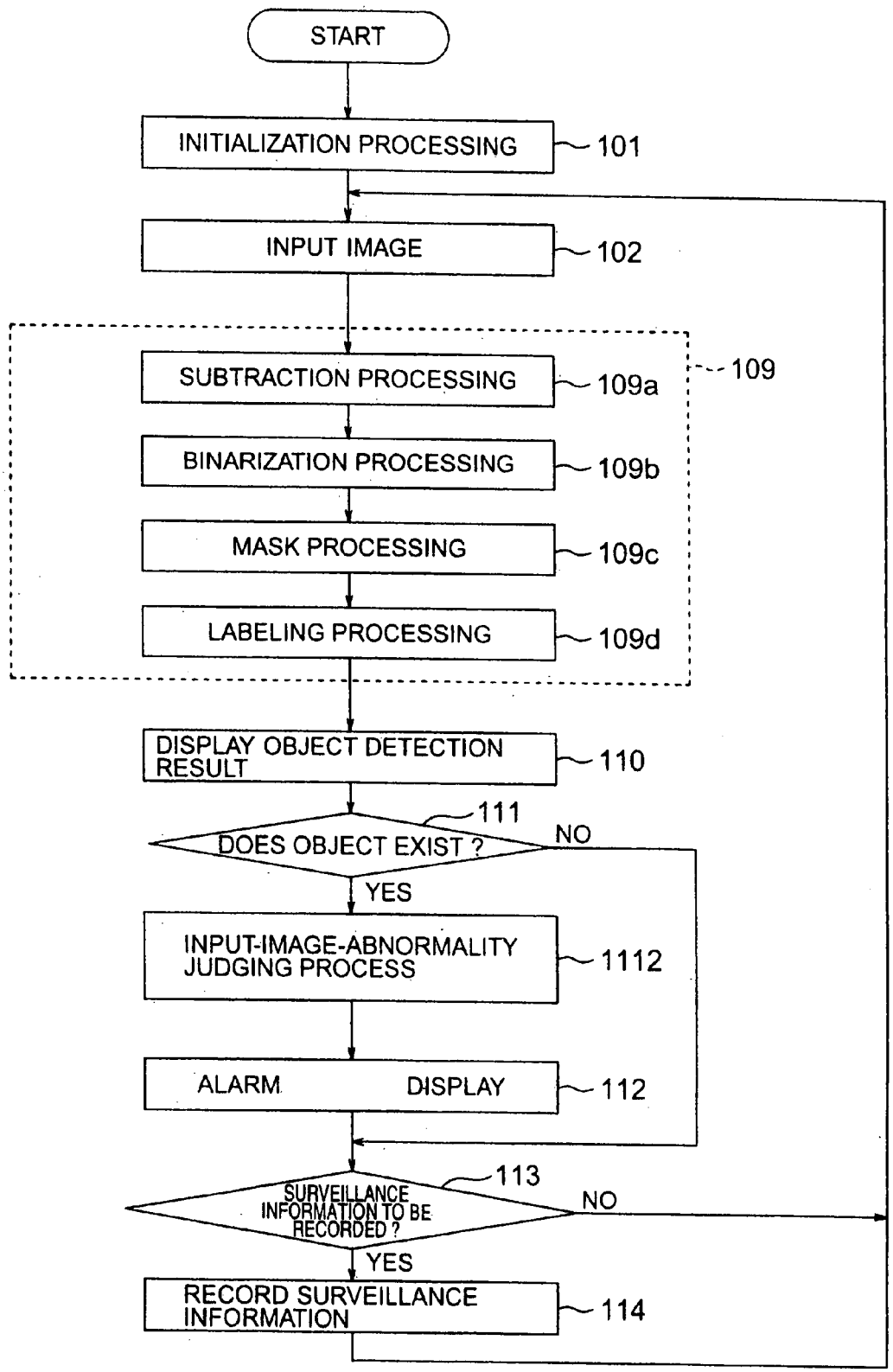
FIG. 11A and FIG. 11B are a flowchart for explaining the processing flow according to a third embodiment of the present invention.

At the time of the ordinary intruding-object surveillance, the surveillance of the intruding object is performed in accordance with processing steps illustrated in FIG. 11A. Explanation will be omitted regarding the processing contents at the respective steps, since the contents are basically the same as the ones explained in the first and second embodiments referring to FIG. 1 and FIG. 2.

Figure 11B:
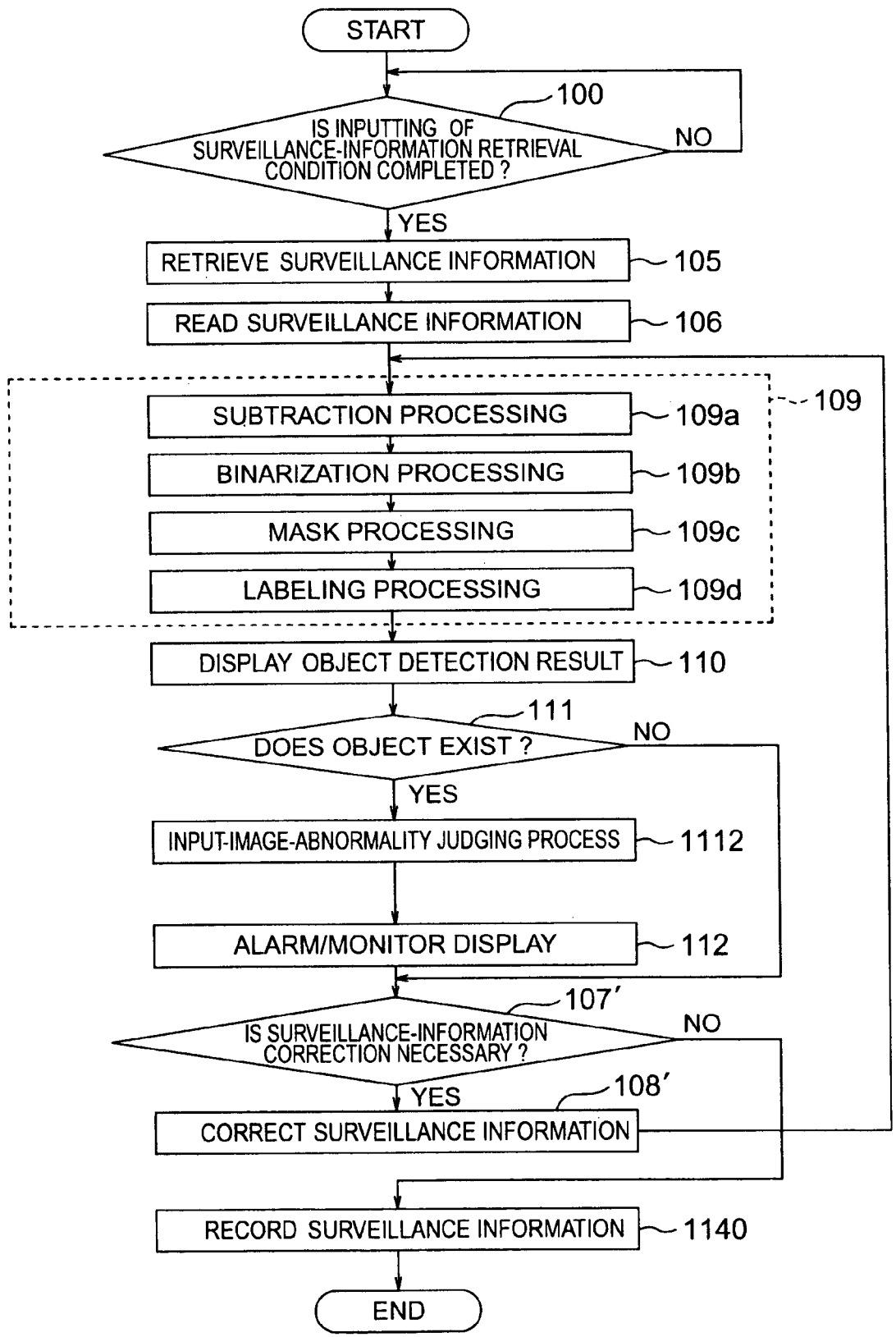

The processing in FIG. 11B is started up as follows: The operator operates the operating device E03 at a predetermined point-in-time so as to issue an adjustment-task instruction of the surveillance-information parameters, thereby starting up the processing. When the inputting of a surveillance-information retrieval condition has been completed (step 100), surveillance information that the operator wishes is retrieved and read from the external storage device E04 (steps 105, 106). The surveillance information thus read includes the information indicated in, e.g., FIG. 6B (i.e., past input image, detection parameters thereof, and the like). At the step 109, the object detection is performed with respect to the past input image thus read. Then, at the step 110, the past input image and the detection result are reproduced on the monitor E05. As having been described earlier, the intruding object detected is displayed on the monitor E05 in the state of being superimposed on the input image. If the operator wishes to correct the detection parameters (e.g., binarized threshold value and masking image), the parameters are corrected based on the values that the operator has inputted using the operating device E03 (steps 107', 108').

Next, the processing goes back to the step 109 and, based on the corrected parameters, the object detection is performed once again with respect to the input image displayed on the monitor E05, then displaying the object detection result on the monitor E05 (steps 109, 110). At the subsequent object-existence judging step 111, it is checked whether or not, of the clusters of the pixels which have been equipped with the pixel value "255" within the binarized image and to which the numbers have been attached at the labeling processing step 109d, there exists a cluster that, based on the predetermined object detection conditions, can be judged to be an object that should be detected. If there exists such a cluster, the processing goes to the input-image-abnormality judgment processing step 1112. Meanwhile, if there exists no such cluster, the processing is branched into the surveillance-information correction judging step 107', and the input-image-abnormality judgment processing step 1112 and the alarm/monitor displaying step 112 are skipped. Additionally, the judgment criteria or the judgment conditions, which are used in the processing at the object-existence judging step 111 and indicate whether or not the object is a one that should be detected, are just as was explained in the embodiment illustrated in FIG. 1. Moreover, at the step 1112, using the area of the cluster of the pixels having the pixel value "255" within the binarized image, it is judged whether or not the input image is abnormal. If the input image is normal, the alarm/monitor displaying step 112 is started up. Furthermore, if, using the operating device E03, the operator inputs a notification to the effect that the corrected parameters have been found to be satisfactory enough (namely, if "No" in step 107'), the initial values in the ordinary intruding-object detection processing are rewritten into these corrected parameters (step 1140). As a result, starting up afterwards the ordinary intruding-object surveillance processing in FIG. 11A allows the corrected parameters to be read out at the initialization step 101. Accordingly, it turns out that the intruding-object detection thereinafter will be carried out based on the corrected parameters.

Figure 6A:
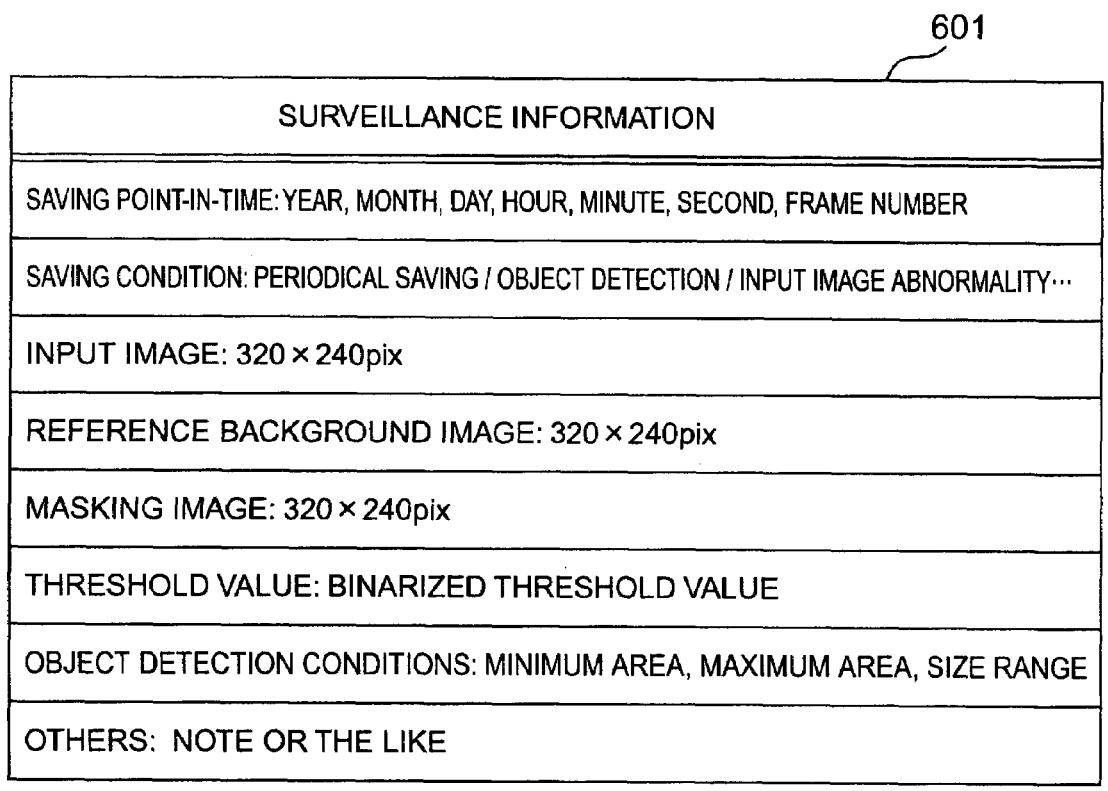

According to the present embodiment, the operator finds it possible to repeatedly perform the adjustment task of the parameters while watching the monitor. Incidentally, instead of storing the corrected parameters as the initial values, an item "adjustment task" may be provided as a new saving condition and the corrected surveillance information may be recorded into the external storage device E04. Also, in the above-described embodiments, explanation has been given selecting, as the example, the case where the "input image" of the surveillance information illustrated in FIG. 6A is an image that is equivalent to 1 frame (i.e., freeze-frame picture or static or still picture). Alternatively, the "input image" may be recorded as a motion picture including plural frames that are continuous in time. Consequently, it is also possible to perform the adjustment of the parameters while reproducing the motion picture on the monitor E05.

In the above-described embodiments, explanation has been given selecting, as the example, the case where the subtraction method is applied to the object detection method. It is needless to say, however, that, as the object detection method, other methods than the subtraction method also make it possible to perform the recording, retrieval, reading, parameter corrections of surveillance information that is basically the same although types of the parameters included therein are different. Also, in the above-described embodiments, explanation has been given selecting, as the example, the case where the intruder has been detected. Alternatively, various types of objects may be employed as the detection targets. For example, the detection may be a foreign-matter detection for the detection of a stationary object and the outside-appearance inspection.

According to the above-described embodiment, it becomes possible to reproduce, at an arbitrary point-in-time, a surveillance result prior thereto. This allows the surveillance result to be reproduced without being influenced by the occurrence timing of an object's false detection caused by an insufficient adjustment of the parameters. This, further, makes it easy to implement a proper adjustment of the parameters, thereby making it possible to easily provide high-reliability object detection method and object detection apparatus, Next, referring to FIG. 13, FIG. 14, FIG. 15, and FIG. 16, explanation will be given below concerning a fourth embodiment. In the fourth embodiment, there is provided a communications unit connected with a remote operating device (which will be described later) that makes it possible to adjust the surveillance-information parameters at a remote site. This allows the surveillance-information parameters to be adjusted even at a place far away from the surveillance apparatus E00. For example, the remote operating device is installed at an office of a maintenance business that manages and operates the surveillance apparatus E00 (i.e., user).

Figure 14:
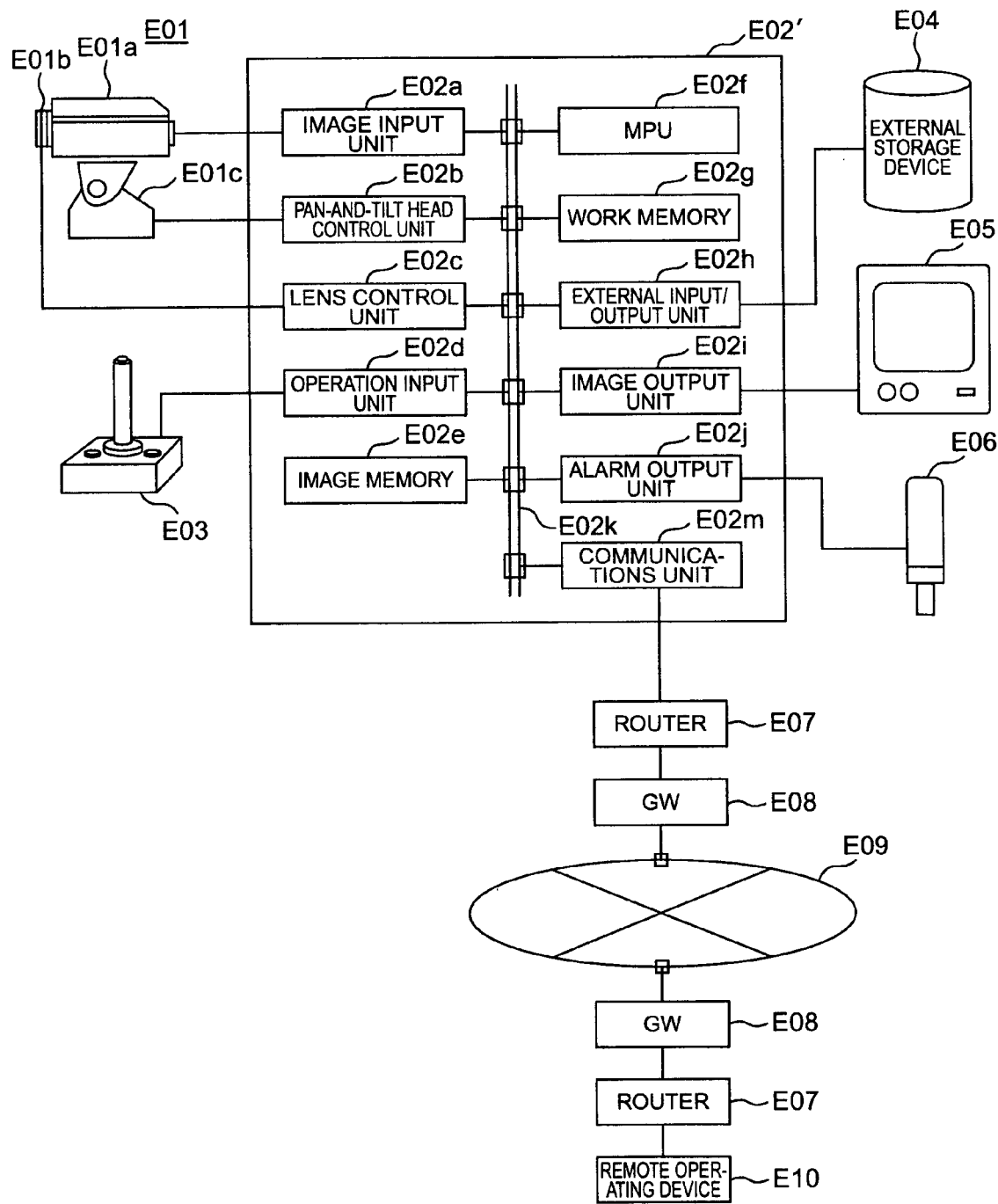
Figure 15:
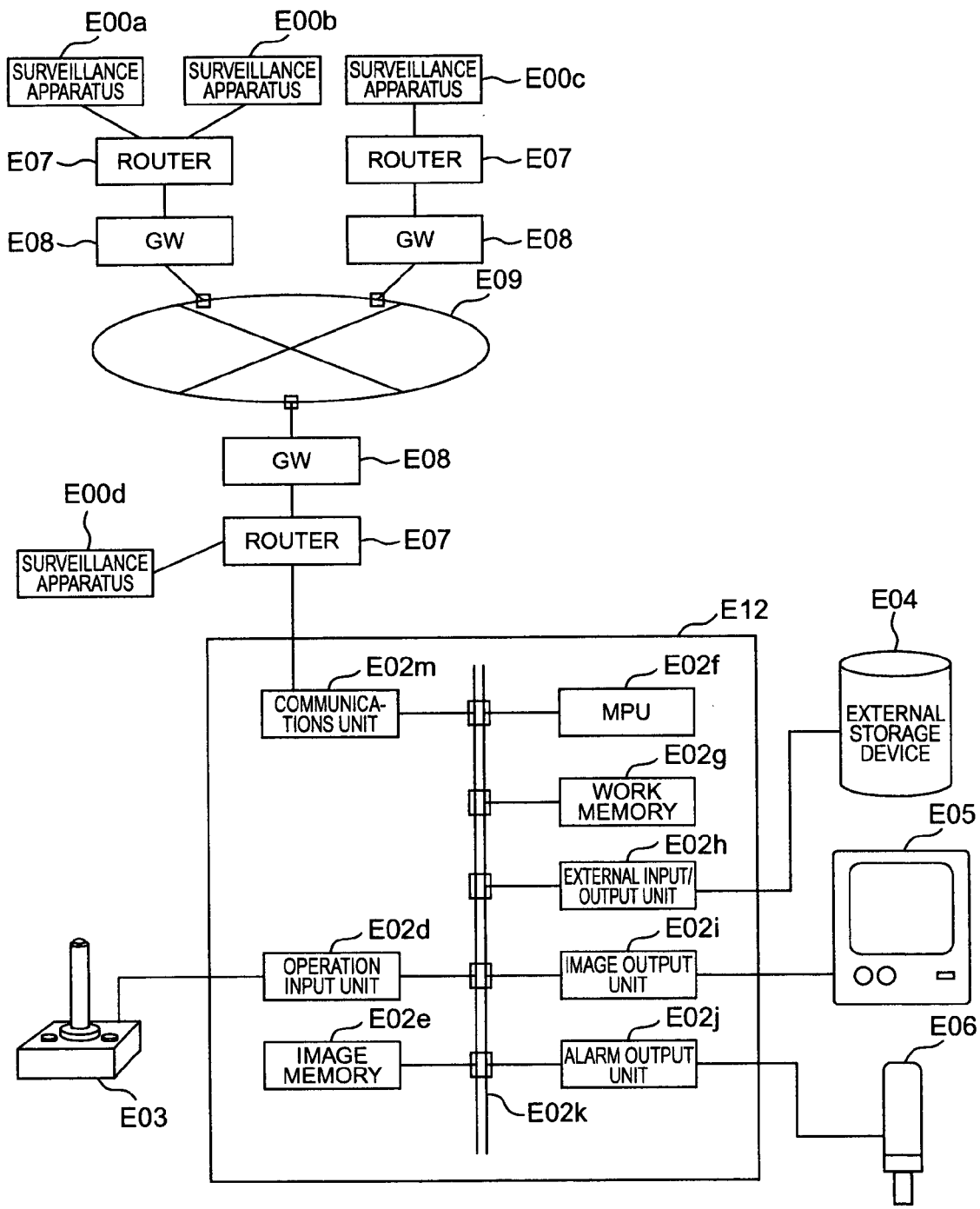
FIG. 15 is a diagram for illustrating the hardware configuration of a remote operating device used in the fourth embodiment.

FIGS. 14 and 15 illustrate one example of the hardware configuration of the surveillance apparatus E00 according to the embodiment of the present invention. In FIG. 14, configuration appliances E01 to E06 are the same as in the one example of the hardware configuration illustrated in FIG. 3. In a processing device E02', however, a communications unit E02m is added into the processing device E02 explained using FIG. 3. This allows the implementation of the communications with a remote operating device E10 that makes it possible to adjust the surveillance-information parameters at a remote site.

The communications unit E02m performs the communications with the remote operating device E10 via an external network E09, e.g., a LAN or the Internet, and based on the control by the MPU E02f, and in accordance with a communications protocol, e.g., the IP (Internet Protocol). For the implementation of the communications between the processing device E02' and the remote operating device E10, there are provided routers E07 for performing a route selection for the communications data, and gateways E08 for performing the exchange of the communications data with the external network E09. With respect to communications data to be transmitted from the processing device E02' to the remote operating device E10, the router E07, via the communications unit E02m, establishes a route selection attaining to the gateway E08 connected to the external network E09. Accordingly, the data is transmitted to the external network E09 by the gateway E08. Moreover, with respect to the data transmitted to the external network E09, the gateway E08 establishes a route selection to the router E07. Consequently, the data attains to the remote operating device E10 via the router E07.

Conversely, with respect to communications data to be transmitted from the remote operating device E10 to the processing device E02', the router E07 establishes a route selection attaining to the gateway E08 connected to the external network E09. Accordingly, the data is transmitted to the external network E09 by the gateway E08. Moreover, with respect to the data transmitted to the external network E09, the gateway E08 establishes a route selection to the router E07. Consequently, the data arrives at the processing device E02' via the router E07.

Next, FIG. 15 illustrates one example of the hardware configuration of the remote operating device E10. Incidentally, the same reference numerals have been attached to configuration appliances that exhibit basically the same functions as the ones in FIG. 14. Namely, in FIG. 15, the remote operating device E10 includes a processing device E12, the operating device E03, the external storage device E04, the surveillance monitor E05, and the warning lamp E06. The processing device E12 is a device resulting from removing the image input unit E02a, the pan-and-tilt head control unit E02b, and the lens control unit E02c from the processing device E02' illustrated in FIG. 14. The reason for this removal is as follows: The remote operating device E10 is a device for adjusting the surveillance-information parameters recorded in the surveillance apparatuses E00; and thus does not require the units for picking up the image of the surveillance region, such as the image input unit, the pan-and-tilt head control unit, and the lens control unit. The explanation will be omitted regarding the appliances other than these units, since these appliances are the same as the ones explained in FIG. 3 and FIG. 14.

The processing device E12 performs communications with the surveillance apparatuses E00 via the communications unit E02m. The communications routes, just as explained using FIG. 14, are configured by the routers E07, the gateways E08, the external network E09, and the like. Explaining concretely, the communications between the processing device E12 and the surveillance apparatuses E00 are as follows, depending on this configuration: The processing device E12 can perform communications with a surveillance apparatus E00a, a surveillance apparatus E00b, and a surveillance apparatus E00c via the external network E09. Otherwise, the device E12 can perform communications with a surveillance apparatus E00d not via the external network E09 but via the router E07. Namely, the appliances that configure the communications routes allow the processing device E12 to perform the communications with at least one or more surveillance apparatuses E00.

Figure 13:
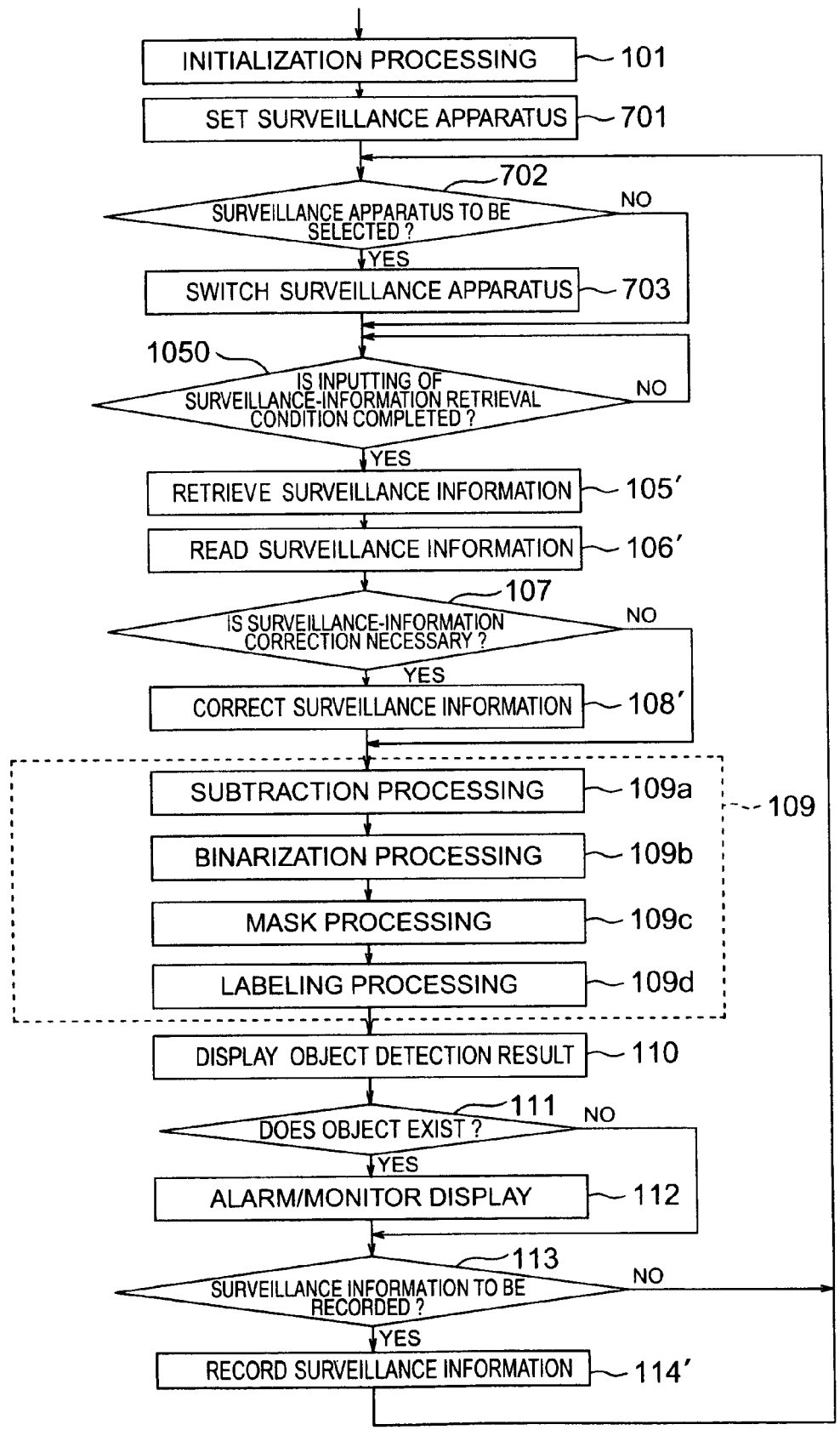
FIG. 13 and FIG. 14 are a diagram for illustrating a flowchart for explaining the processing in a fourth embodiment of the present invention and a diagram for illustrating the hardware configuration therein, respectively.

Referring to FIG. 13, explanation will be given below concerning one example of the manipulation process by the processing device E12 of the remote operating device E10. In FIG. 13, the same reference numerals have been attached to processing steps that are basically the same as the ones in FIG. 2A and FIG. 2B. The steps in FIG. 13 result from adding a surveillance-apparatus setting step 701, a surveillance-apparatus selecting step 702, and a surveillance-apparatus switching step 703 to the steps of the second embodiment illustrated in FIG. 2A and FIG. 2B, and removing therefrom the image input step 102, the reproduction-request judging step 103, the surveillance-information saving step 104, the surveillance-information restoration judging step 115, and the surveillance-information restoring step 116. Also, a surveillance-information retrieving step 105', a surveillance-information reading step 106', a surveillance-information correcting step 108', a surveillance-information record judging step 113', and a surveillance-information recording step 114' are each obtained by extending the functions of the surveillance-information retrieving step 105, the surveillance-information reading step 106, the surveillance-information correcting step 108, the surveillance-information record judging step 113, and the surveillance-information recording step 114 explained using FIG. 2A and FIG. 2B. Here, the above-described function extension is performed such that the remote operating device E10 can perform communications with a predetermined surveillance apparatus E00 via the communications unit E02m, and can perform the retrieval, reading, corrections, and recording of surveillance information recorded within the surveillance apparatus E00. Here, the explanation will be given selecting the newly added steps as its central contents. Explanation will be omitted regarding the other steps, since these other steps are basically the same as the ones explained in FIG. 2.

In FIG. 13, at the surveillance-apparatus setting step 701, when staring up the remote operating device E10, a surveillance apparatus E00 is determined with which the remote operating device E10 should establish the connection first. For example, the surveillance apparatus E00d is selected which is the nearest (i.e., number of the appliances through which the communications data passes is the smallest) to the processing device E12. Otherwise, a surveillance apparatus is selected with which the remote operating device E10 has performed the communications last.

Next, at the surveillance-apparatus selecting step 702, it is judged whether or not the operator of the remote operating device E10 has performed an input to the effect that the surveillance apparatus E00 for adjusting the surveillance-information parameters be switched. The operation of the operating device E03, for example, allows the operator to instruct the processing device E12 of the remote operating device E10 to switch the surveillance apparatus E00. If switching the surveillance apparatus E00 is to be performed, the processing goes to the surveillance-apparatus switching step 703. Meanwhile, if switching the surveillance apparatus E00 is not to be performed, the processing is branched into the surveillance-information retrieval-condition input completion judging step 1050'.

At the surveillance-apparatus switching step 703, switching the surveillance apparatus E00 for adjusting the surveillance-information parameters is performed. The surveillance apparatuses E00 are managed using, e.g., the IP addresses (i.e., 32-bit unique address data allocated to the appliances that, in the IP communications protocol, perform the transmission/reception of communications data). As a result, switching the surveillance apparatus E00 is performed as follows: A list of the IP addresses of the surveillance apparatuses E00 is displayed on the monitor E05 of the remote operating device E10, and then the operator of the remote operating device E10 selects one surveillance apparatus E00 from among them. The operation of the operating device E03, for example, allows the operator to select the new surveillance apparatus E00 for adjusting the surveillance-information parameters. When switching the surveillance apparatus E00 has been performed, the communications unit E02m of the processing device E12 turns out to perform communications with the selected surveillance apparatus E00 until switching the selected surveillance apparatus E00 is performed next. Additionally, in the selection from among the surveillance apparatuses E00, in addition to the method of displaying the list of the IP addresses, it is also allowable to display a list of the domain names (which are managed by the DNS (Domain Name Server) and are automatically converted into the IP addresses at the time of the communications) of the surveillance apparatuses E00, or the like. Also, in order to prevent wiretapping or tampering of the surveillance information on the communications routes, it is allowable to provide a function of implementing the VPN (Virtual Path Network), the encryption, or the like on the gateways E08. Also, it is allowable to leave the operator to select a surveillance apparatus E00 by displaying a list of surveillance apparatuses E00 that request the adjustment of the surveillance-information parameters, a list of surveillance apparatuses E00 that have not adjusted the surveillance-information parameters for more than a constant time-period, or the like.

As described above, in the remote operating device E10, the surveillance apparatus E00 for adjusting the surveillance-information parameters is selected. Next, at the surveillance-information retrieving step 105', the surveillance information is retrieved which has been recorded in the external storage device E04 of the selected surveillance apparatus E00. Moreover, at the surveillance-information reading step 106', the desired surveillance information thus retrieved is received from the surveillance apparatus E00 via the communications unit E02m, then writing the received surveillance information into the work memory E02g of the processing device E12.

At the surveillance-information correcting step 108', the parameters are corrected based on an instruction from the operator of the remote operating device E10. Next, the processing device E12 performs the object detection processing and the like (steps 109 to 111). At the step 112, the detection processing result based on the corrected parameters is displayed on the monitor E05 of the remote operating device E10.

Still next, if, using the operating device E03, the operator of the remote operating device E10 inputs a notification to the effect that the corrected parameters have been found to be satisfactory enough (i.e., at the surveillance-information record judging step 113', the recording has been judged to be YES), at the surveillance-information recording step 114', the remote operating device E10 transmits the corrected parameters to the surveillance apparatus E00 via the communications unit E02m. Then, the surveillance apparatus E00 records the received parameters into the work memory E02g of the surveillance apparatus E00.

Also, at the surveillance-information recording step 114' (in the case where the recording has been judged to be YES at the surveillance-information record judging step 113'), e.g., the ID number, the adjustment time-and-date, the adjustment contents, the service point, and the like of the surveillance apparatus E00 that has adjusted the surveillance-information parameters are recorded into the external storage device E04 of the remote operating device E10. FIG. 16 is a diagram for illustrating one embodiment of the contents of a table 1601 recorded into the external storage device E04 by the processing at the step 114'. Here, the service point means a point predetermined in correspondence with the maintenance (i.e., adjustment) contents. In the embodiment in FIG. 16, the service point is defined like, e.g., 1 point if the threshold value has been adjusted, and 2 points if the reference background image has been updated. Based on the record contents on the table 1601, the maintenance business collects, e.g., once a month, a charge corresponding to this service point from the user of each surveillance apparatus E00. Incidentally, concerning the charge, it may be determined in correspondence with the number of the maintenances or the like. Otherwise, a charge system that a fixed price is charged on a monthly basis may be applied thereto.

As having been explained so far, the use of the remote operating device E10 allows the execution of the retrieval, reading, corrections, and recording of surveillance information in a surveillance apparatus E00 installed at a remote site, thereby making it possible to execute the adjustment of the surveillance-information parameters. Namely, an operator who wishes to adjust the surveillance-information parameters can adjust the surveillance-information parameters in the surveillance apparatus E00 via the remote operating device E10 without the necessity for the operator to go to the site where the surveillance apparatus E00 has been installed. Also, recording the contents of a parameters' adjustment task makes it possible to collect a charge corresponding to the adjustment task from the user of each surveillance apparatus E00. Namely, according to the fourth embodiment, the maintenance business that manages and operates each surveillance apparatus E00 can provide a surveillance-information parameter adjustment service to the user of each surveillance apparatus E00, i.e., the client. This allows the intruding-object detection performance of each surveillance apparatus E00 to be always maintained at a high level.

Incidentally, the surveillance information in each surveillance apparatus E00 and the surveillance-information parameters after being corrected by the surveillance-information correcting step 108' may also be recorded into the external storage device E04 of the remote operating device E10. Also, from the remote operating device E10, the operator can make reference to the table 901 in FIG. 9 which has been recorded in the external storage device E04 of each surveillance apparatus E00. Also, the object detection processing step 109 and the like after the correction task may be left to and performed by the processing device E02' on the side of each surveillance apparatus E00, and the remote operating device E10 may receive only the image of the detection result. Additionally, the parameter adjustment service from the remote operating device E10 to each surveillance apparatus E00 is not limited to the above-described mode. For example, the parameters that have been corrected within the remote operating device E10 on the basis of the surveillance information received from the surveillance apparatus E00a can also be transmitted to the other surveillance apparatuses, i.e., the surveillance apparatus E00b, the surveillance apparatus E00c, and the surveillance apparatus E00d. Also, parameters corresponding to, e.g., time-zone, season, weather, and the like may be prepared so as to be periodically transmitted to a predetermined surveillance apparatus E00.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A parameter setting method for setting parameters used in detecting an object from an image taken by a camera by processing the image based on the parameters, said parameter setting method comprising the steps of:
   when an object is detected, recording surveillance information including an image of the detected object and parameters used in the detection of the object;
   based on the recorded surveillance information, displaying on a display unit an image representing a result of the detection of the object and the parameters used in the detection of the object;
   correcting the parameters used in the detection of the object based on values input by an operator;
   performing again the detection of the object with respect to the image included in the recorded surveillance information based on the corrected parameters;
   displaying on the display unit a result of the detection of the object which was performed again, and the corrected parameters;
   wherein said parameters include at least one of:
   a reference image which is subtracted from the image taken by the camera to acquire a subtraction image,
   a threshold value for binarizing the subtraction image,
   a masking area where the binarized subtraction image is masked, and
   a range of object size which represents a size of a cluster of pixels within the binarized subtraction image to be detected.

2. The parameters setting method according to claim 1, further comprising the step of:
   searching surveillance information when a plurality of surveillance information have been recorded.

3. A parameter setting apparatus for setting parameters used in detecting an object from an image taken by a camera by processing the image based on the parameters, said parameter setting apparatus comprising:
   a unit for, when an object is detected, recording surveillance information including an image of the detected object and parameters used in the detection of the object;
   a unit for, based on the recorded surveillance information, displaying on a display unit an image representing a result of the detection of the object and the parameters used in the detection of the object;
   a unit for correcting the parameters used in the detection of the object based on values input by an operator;
   a unit for performing again the detection of the object with respect to the image included in the recorded surveillance information based on the corrected parameters;
   a unit for displaying on the display unit a result of the detection of the object which was performed again, and the corrected parameters;
   wherein said parameters include at least one of:
   a reference image which is subtracted from the image taken by the camera to acquire a subtraction image,
   a threshold value for binarizing the subtraction image,
   a masking area where the binarized subtraction image is masked, and
   a range of object size which represents a size of a cluster of pixels within the binarized subtraction image to be detected.

4. The parameter setting apparatus according to claim 3, further comprising:
   a unit for searching surveillance information when a plurality of surveillance information have been recorded.

* * * * *